United States Patent
Cooper

[19]

[11] Patent Number: 6,093,000
[45] Date of Patent: Jul. 25, 2000

[54] MOLTEN METAL PUMP WITH MONOLITHIC ROTOR

[76] Inventor: Paul V Cooper, 11247 Lake Forest Dr., Chesterland, Ohio 44026

[21] Appl. No.: 09/132,934

[22] Filed: Aug. 11, 1998

[51] Int. Cl.[7] .................................................. F04B 17/00
[52] U.S. Cl. .................................. 417/423.6; 417/423.15
[58] Field of Search .............................. 417/423.1, 423.6, 417/423.15, 423.12; 415/200

[56] References Cited

U.S. PATENT DOCUMENTS

| | | |
|---|---|---|
| 209,219 | 10/1878 | Bookwalter . |
| 251,104 | 12/1881 | Finch . |
| 364,804 | 6/1887 | Cole . |
| 898,499 | 9/1908 | O'Donnell . |
| 1,669,668 | 5/1928 | Marshall . |
| 1,717,969 | 6/1929 | Goodner . |
| 3,512,788 | 5/1970 | Kilbane . |
| 3,836,280 | 9/1974 | Koch ........................................ 415/175 |
| 4,068,965 | 1/1978 | Lichti . |
| 4,126,360 | 11/1978 | Miller et al. . |
| 4,867,638 | 9/1989 | Handtmann et al. . |
| 5,092,821 | 3/1992 | Gilbert et al. . |
| 5,143,357 | 9/1992 | Gilbert et al. . |
| 5,162,858 | 11/1992 | Gilbert et al. ........................ 416/223 B |
| 5,203,681 | 4/1993 | Cooper . |
| 5,318,360 | 6/1994 | Langer et al. . |
| 5,399,074 | 3/1995 | Nose et al. . |
| 5,431,551 | 7/1995 | Aquino et al. ......................... 418/61.2 |
| 5,558,505 | 9/1996 | Mordue et al. . |
| 5,586,863 | 12/1996 | Gilbert et al. . |
| 5,597,289 | 1/1997 | Thut . |
| 5,622,481 | 4/1997 | Thut ........................................ 417/319 |
| 5,634,770 | 6/1997 | Gilbert et al. . |
| 5,655,849 | 8/1997 | McEwen et al. . |
| 5,662,725 | 9/1997 | Cooper . |
| 5,685,701 | 11/1997 | Chandler et al. . |
| 5,735,668 | 4/1998 | Klien . |
| 5,785,494 | 7/1998 | Vild et al. ............................... 415/200 |

FOREIGN PATENT DOCUMENTS

| | | |
|---|---|---|
| 683469 | 3/1964 | Canada . |
| 0665378 | 2/1995 | European Pat. Off. . |
| 1800446 | 11/1969 | Germany . |
| 58-48796 | 3/1983 | Japan . |
| 63-104773 | 5/1998 | Japan . |
| 90756 | 1/1958 | Norway . |
| 392268 | 9/1965 | Switzerland . |
| 416401 | 6/1974 | U.S.S.R. . |
| 773312 | 10/1980 | U.S.S.R. . |
| 942648 | 11/1963 | United Kingdom . |
| 2217784 | 11/1989 | United Kingdom . |
| 9825031 | 11/1998 | WIPO . |

*Primary Examiner*—Teresa Walberg
*Assistant Examiner*—Thor Campbell
*Attorney, Agent, or Firm*—David E. Rogers; Michael A. Lechter; Squire, Sanders & Dempsey

[57] ABSTRACT

A device for pumping molten metal that eliminates rotor bearing members comprises a pump having a pump chamber including a first bearing surface, and a monolithic rotor having a second bearing surface that aligns with the first bearing surface. The second bearing surface is formed of and integral with the material forming the rotor. Preferably a rigid rotor shaft to motor shaft connection is utilized to rigidly center the rotor within the pump chamber and, hence, within the first bearing surface.

19 Claims, 22 Drawing Sheets

6,093,000

MOLTEN METAL PUMP WITH MONOLITHIC ROTOR

FIELD OF THE INVENTION

The present invention relates to a system and device for pumping molten metal and, in particular, a monolithic rotor that does not include separate bearing members.

BACKGROUND OF THE INVENTION

A number of submersible pumps used to pump molten metal (referred to herein as molten metal pumps) are known in the art. For example, U.S. Pat. No. 2,948,524 to Sweeney et al., U.S. Pat. No. 4,169,584 to Mangalick, U.S. Pat. No. 5,203,681 to Cooper, and pending U.S. patent application Ser. No. 08/439,739 to Cooper, the disclosures of which are incorporated herein by reference, all disclose molten metal pumps. The term submersible means that when the pump is in use, its base is submerged in a bath of molten metal.

Three basic types of pumps for pumping molten metal, such as aluminum, are utilized, circulation pumps, transfer pumps and gas-release pumps. Circulation pumps are used to circulate the molten metal within a bath, thereby equalizing the temperature of the molten metal and creating a uniformly consistent alloy. Most often, as is known by those skilled in the art, circulation pumps are used in conjunction with a reverbatory furnace having an external well. The well is usually an extension of the charging well where scrap metal is charged (i.e., added).

Transfer pumps are generally used to transfer molten metal from the external well of the furnace to a different location such as a ladle or another furnace.

Gas-release pumps, such as gas-injection pumps, circulate the molten metal while adding a gas into the flow of molten metal in order to "demag" or "degas" the molten metal. In the purification of molten metals, particularly aluminum, it is frequently desired to remove dissolved gases such as hydrogen, or dissolved metals, such as magnesium. As is known by those skilled in the art, the removing of dissolved gas is known as "degassing" while the removal of magnesium is known as "demagging."

All molten-metal pumps include a pump base that comprises a housing, also called a casing, a pump chamber, which is an open area formed within the housing, and a discharge, which is a channel or conduit communicating with the chamber and leading from the chamber to an outlet formed in the exterior of the casing. A rotor, also called an impeller, is mounted in the pump chamber and connected to a drive system, which is typically one or more vertical shafts that eventually connect to a motor. As the drive system turns the rotor, the rotor pushes molten metal out of the pump chamber, through the discharge, out of the outlet and into the molten metal bath.

A bearing member is added to the pump casing, which is preferably a ceramic ring attached to the bottom edge of the chamber. The inner perimeter of the ring forms a first bearing surface. A corresponding bearing member, which is a ceramic ring (sometimes referred to as a rotor ring), is attached to the rotor, and its outer perimeter forms a second bearing surface. The rotor is vertically aligned in the pump chamber so that the second bearing surface of the rotor aligns with the first bearing surface of the pump chamber. When the rotor turns, the first bearing surface keeps the second bearing surface centered, which in turn keeps the rotor centered in the pump chamber.

A problem encountered with this arrangement is that the ceramic ring attached to the rotor is fragile and often breaks. It breaks during operation of the pump because of impact against the bearing surface or because pieces of solid material, such as brick or dross present within the aluminum bath, become wedged between the bearing surface and the second bearing surface. The ceramic ring attached to the rotor also breaks during start up because of thermal expansion. In this respect, whenever a rotor including a rotor ring is placed in the pump, the ring is quickly heated from the ambient air temperature within the factory to the temperature of molten aluminum. The ring then expands and can crack. To alleviate cracking due to thermal expansion, the furnace operator may slowly heat the entire furnace to prevent thermal shock to the ring, but this results in downtime and lost production. Finally, the rings are easily damaged during shipping.

SUMMARY OF THE INVENTION

The present invention solves these and other problems by providing a bearing system, which includes a plurality of bearing pins or wedges (collectively referred to herein as bearing members, bearing pins or pins), that are less prone to fracture than a bearing ring. The geometry of each pin allows for thermal expansion without breaking. Generally, the present invention is a plurality of solid, heat-resistant (preferably refractory material) pins that attached to a molten-metal pump rotor. The perimeter of the rotor containing the pins is called a bearing perimeter. The surfaces of the pins that align with the first bearing surface of the pump casing collectively form a second bearing surface.

The material forming each bearing pin is harder than the material forming the rotor, so as to provide a wear-resistant bearing surface. Preferably, a system according to the invention will include a rotor having a plurality of bearing pins equally radially spaced about the rotor. In use, the rotor is mounted within the pump chamber of a molten metal pump so that the bearing pins form a second bearing surface that aligns with the first bearing surface provided in the pump casing.

In another aspect of the invention, a first bearing surface consists of a plug of heat resistant material formed in the base of the molten metal pump chamber and the second bearing surface is formed by a surface of a bore or recess formed in the bottom of the rotor. When the rotor is placed in the pump chamber it is seated on the plug, which is received in the bore or recess in the rotor base. This configuration not only centers the rotor, it vertically aligns the rotor in the pump chamber as well. Furthermore, this arrangement can be reversed, with a plug extending from the bottom of the rotor and forming a second bearing surface. A recess or bore is then formed in the base of the pump chamber. The plug is received in the recess and a surface of the recess forms the first bearing surface.

Also disclosed is a rotor especially designed to receive the bearing pins and a molten metal pump including a rotor with bearing pins.

Furthermore, disclosed herein is a monolithic rotor that does not include a separate bearing member attached to it. This monolithic rotor has a second bearing surface, but has no separate bearing member such as a pin, plug or ring. The advantage of such a monolithic rotor is reduced manufacturing costs because machining the rotor can be accomplished in a simple operation; no bores, grooves or recesses must be formed in the rotor to receive separate bearing member(s). In addition, no cementing of separate bearing members is required. Such a monolithic rotor is preferably formed of a single material, such as graphite.

A monolithic rotor as disclosed herein is preferably used in conjunction with a rigid rotor shaft to motor shaft coupling, which keeps the rotor centered in the pump chamber. Additionally, a monolithic rotor may be used with a monolithic pump casing, wherein the casing has a first bearing surface formed of, and preferably integral with, the same material forming the rest of the pump casing.

DETAILED DESCRIPTION OF A PREFERRED EMBODIMENT

In the present invention, the materials forming all bearing components are preferably structural refractory material, which preferably has high abrasion resistance, and high resistance to disintegration by either corrosive or erosive attack from the molten metal. The material should have capacity to remain relatively stable and to not introduce contaminants into the molten metal. Structural carbonaceous refractory materials, such as carbon of a dense or structural type, including graphite, graphitized carbon, clay-bonded graphite, carbon-bonded graphite, silicon carbide, or the like have all been found to be highly resistant to attack by molten aluminum. Such materials may be coated or uncoated and glazed or unglazed. Pump parts composed of suitable materials may be +made by mixing ground graphite or silicon carbide with a fine clay binder, forming the part and baking. The parts may be subjected to simple machining operations for the silicon carbide or "hard" ceramics or complex machining operations for graphite or "soft" ceramics. Alternatively, some parts such as the support posts can be made from a metal having a suitable coating of refractory material. These materials and the method(s) of producing components using these materials are known to those skilled in the art.

Figure 1:
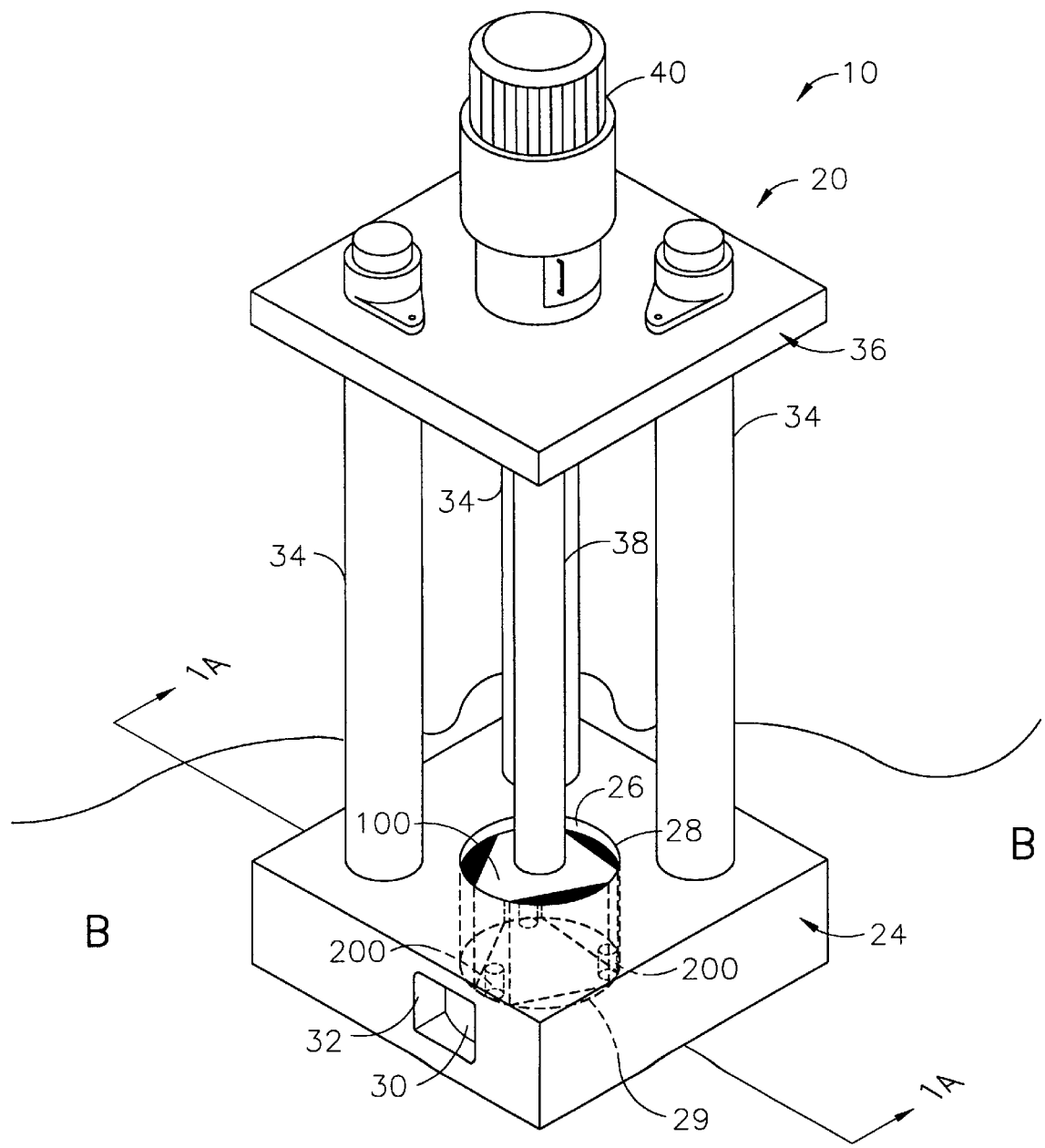
FIG. 1 is a perspective view of a pump for pumping molten metal, which includes a rotor and bearing pins in accordance with the invention.

Referring now to the drawings where the purpose is to illustrate and describe a preferred embodiment of the invention, and not to limit same, FIG. 1 shows a system 10 in accordance with the present invention. System 10 includes a pump 20 having a rotor 100, which includes a plurality of bearing pins 200.

Pump 20 is specifically designed for operation in a molten metal furnace or in any environment in which molten metal is to be pumped or otherwise conveyed. Pump 20 can be any structure or device for pumping or otherwise conveying molten metal. A preferred pump 20 is disclosed in U.S. Patent No. 5,203,681 to Cooper entitled "Submersible Molten Metal Pump," the disclosure of which is incorporated herein by reference. Basically, the preferred embodiment of pump 20, which is best seen in FIG. 1, has a pump base, or casing, 24 submersible in a molten metal bath B. Pump base 24 includes a generally nonvolute pump chamber 26 (although a volute, or any shape chamber, could be used) having top inlet 28, bottom inlet 29, tangential discharge 30 (although another type of discharge, such as a radial discharge may be used), and outlet 32. A plurality of support posts 34 connects base 24 to a superstructure 36 of pump 20 thus supporting superstructure 36. A rotor drive shaft 38 is connected at one end to rotor 100 and at the other end to a coupling (not shown in this embodiment). Pump 20 is usually positioned in a pump well, which is part of the open well of a reverbatory furnace.

A rotor, also called an impeller, 100 is contained within pump chamber 26. Rotor 100 is preferably imperforate, triangular, and includes a circular base 104 (as shown in FIG. 2) although any type or shape of rotor or impeller may be used to practice the invention.

Figure 1A:
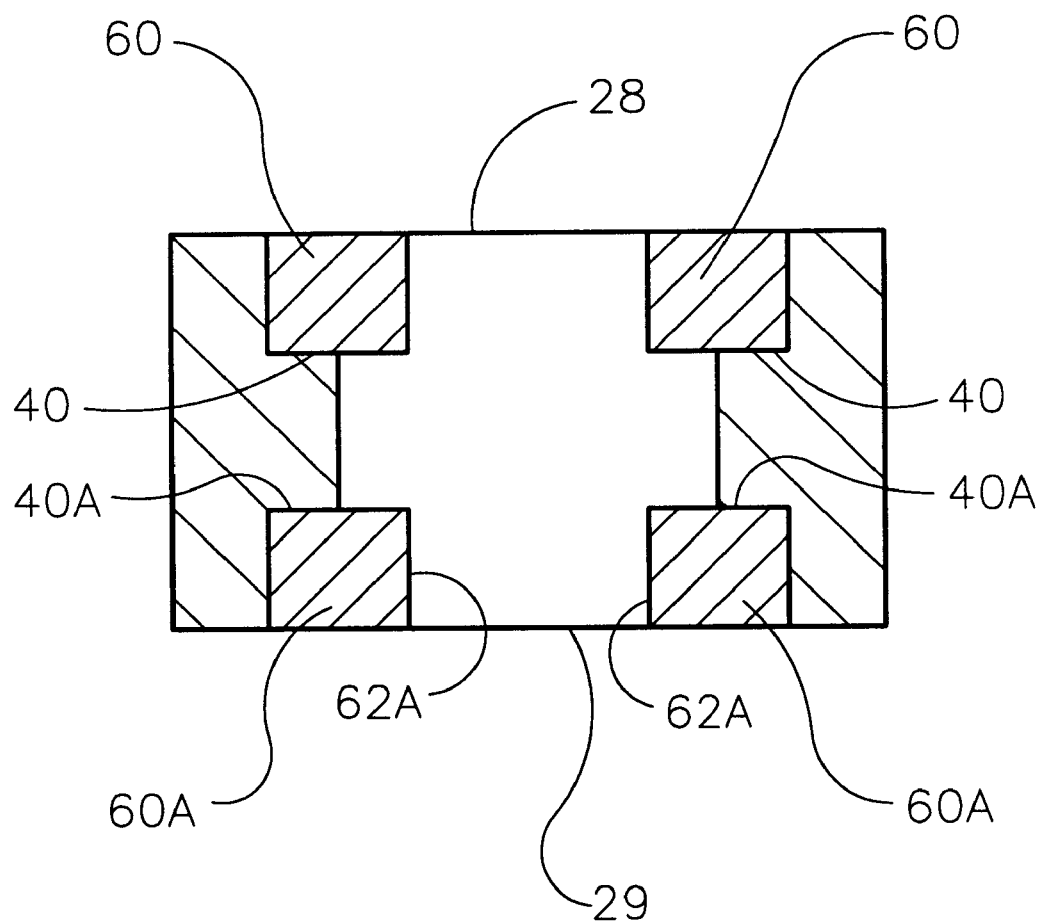
FIG. 1A is a cross-sectional view taken along line 1A—1A of FIG. 1 with the rotor removed.
Figure 11:
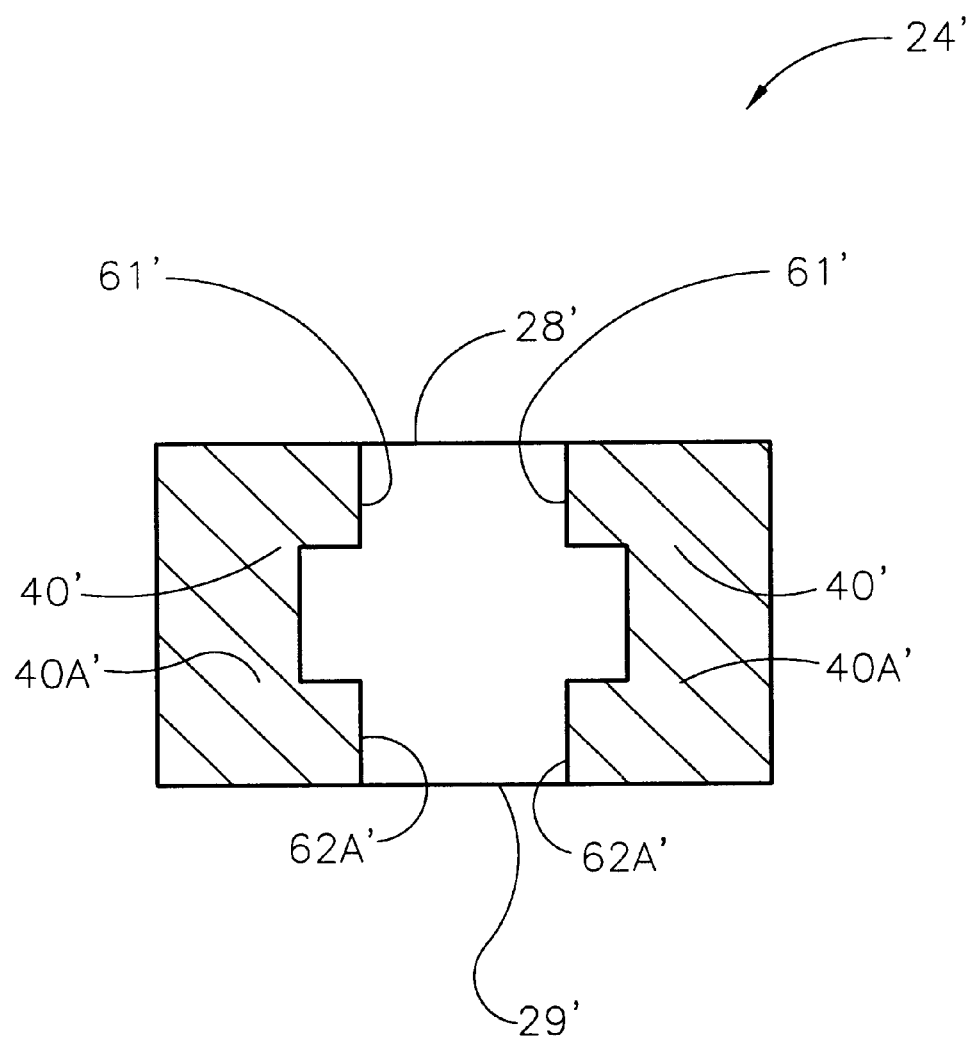
FIG. 11 is a cross-sectional view of a monolithic pump chamber having no bearing rings, but instead having intregal bearing surfaces.

Preferably, the two inlet openings, top inlet 28 and bottom inlet 29, are provided with one of the two preferably being blocked, and most preferably bottom inlet 29 being blocked, by rotor base 104. As shown in FIG. 1A, pump base 24 can have a stepped surface 40 defined at the periphery of chamber 26 at inlet 28 and a stepped surface 40A defined at the periphery of inlet 29, although one stepped surface would suffice. Stepped surface 40 preferably receives a bearing ring member 60 and stepped surface 40A preferably received a bearing ring member 60A. Each bearing member 60, 60A is preferably a ring of silicon carbide. Its outer diameter varies with the size of the pump, as will be understood by those skilled in the art. Bearing member 60 has a preferred thickness of 1". Preferably, bearing ring member 60, is provided at inlet 28 and bearing ring member 60A is provided at inlet 29, respectively, of casing 24. Alternatively, bearing ring members 60, 60A need not be used; all that is necessary for the invention to function is the provision of a first bearing surface to guide rotor 100. For example, in FIG. 11, a pump casing 24' is shown which is monolithic and preferably formed entirely of graphite. Such a monolithic pump casing 24' has no bearing ring member, but instead has bearing surfaces 61' and 62A' integral with and formed of the same material as pump casing 24'. Monolithic pump casing 24' preferably, in all other respects, is the same as casing 24. In the preferred embodiment, bottom bearing ring member 60A includes an inner perimeter, or first bearing surface, 62A, that aligns with a second bearing surface and guides rotor 100 as described herein.

Figure 2:
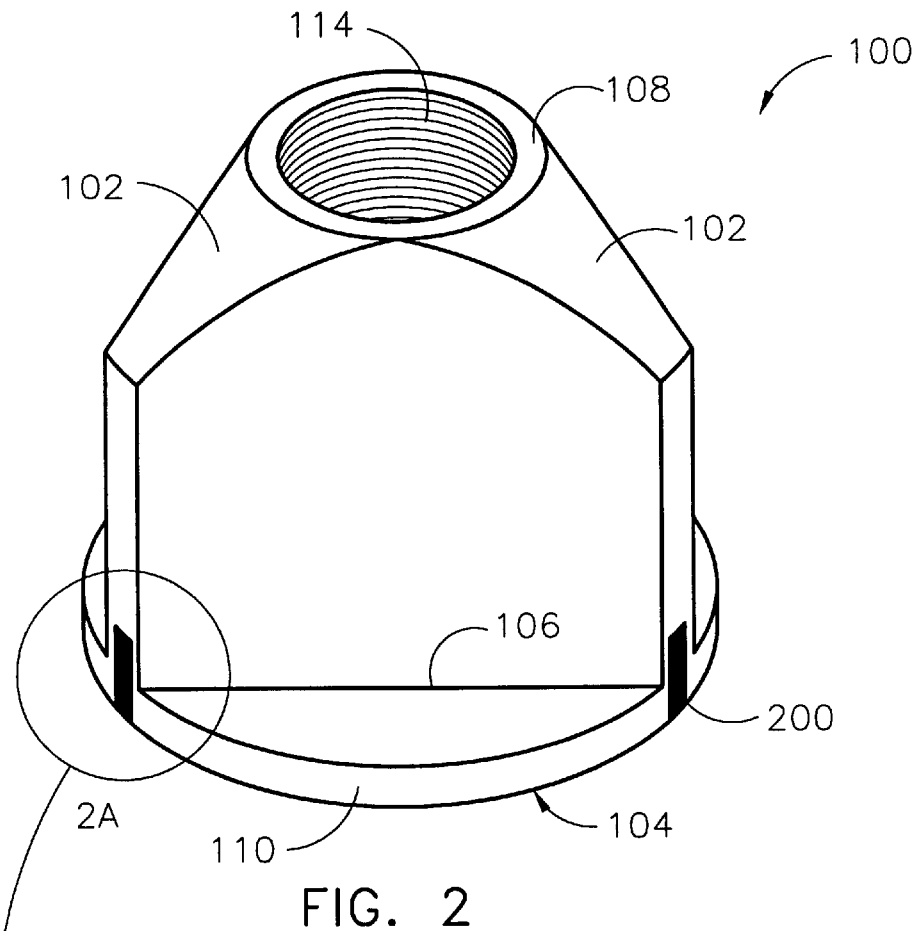
FIG. 2 is a front perspective view of a rotor including bearing pins according to the invention.

The preferred rotor 100, shown in FIG. 2, is imperforate, polygonal, mountable in chamber 26 and sized to fit through both inlet openings 28 and 29. Rotor 100 is preferably triangular (or trilobal), having three vanes 102. Rotor 100 also has a connecting portion 114 to connect to rotor drive shaft 36. A rotor base, also called a flow-blocking and bearing plate, 104 is mounted on either the bottom 106 or top 108 of rotor 100. Bearing pins 200 are attached to base 104 of rotor 100 along outer perimeter 110. Base 104 is sized to rotatably fit and be guided by the appropriate one of bearing ring members 60 or 60A mounted in casing 24. In the embodiment shown, base 104 has an outer perimeter 110.

Figure 3:
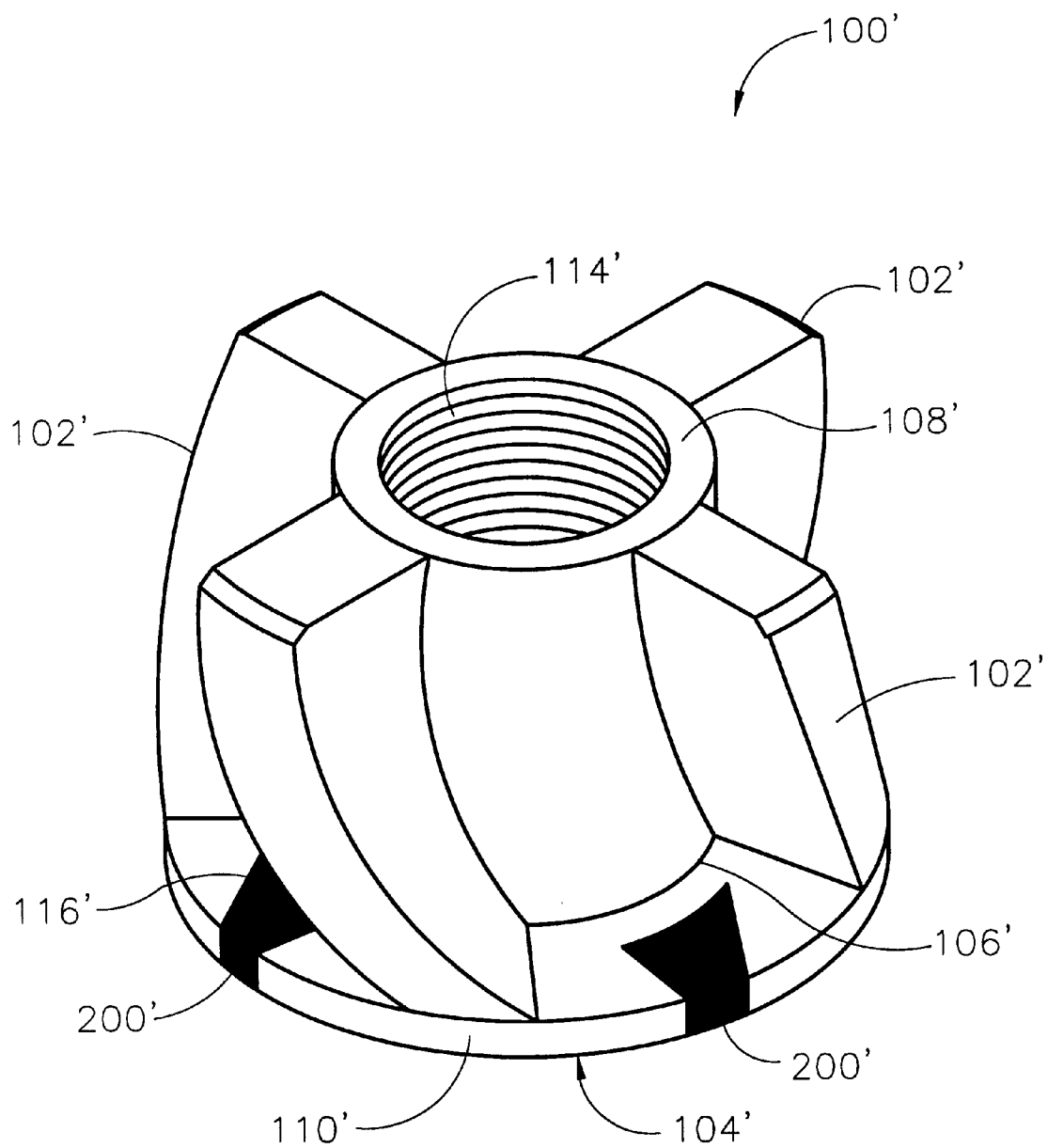
FIG. 3 is a perspective view of an alternate rotor including alternate bearing pins according to the invention.
Figure 5:
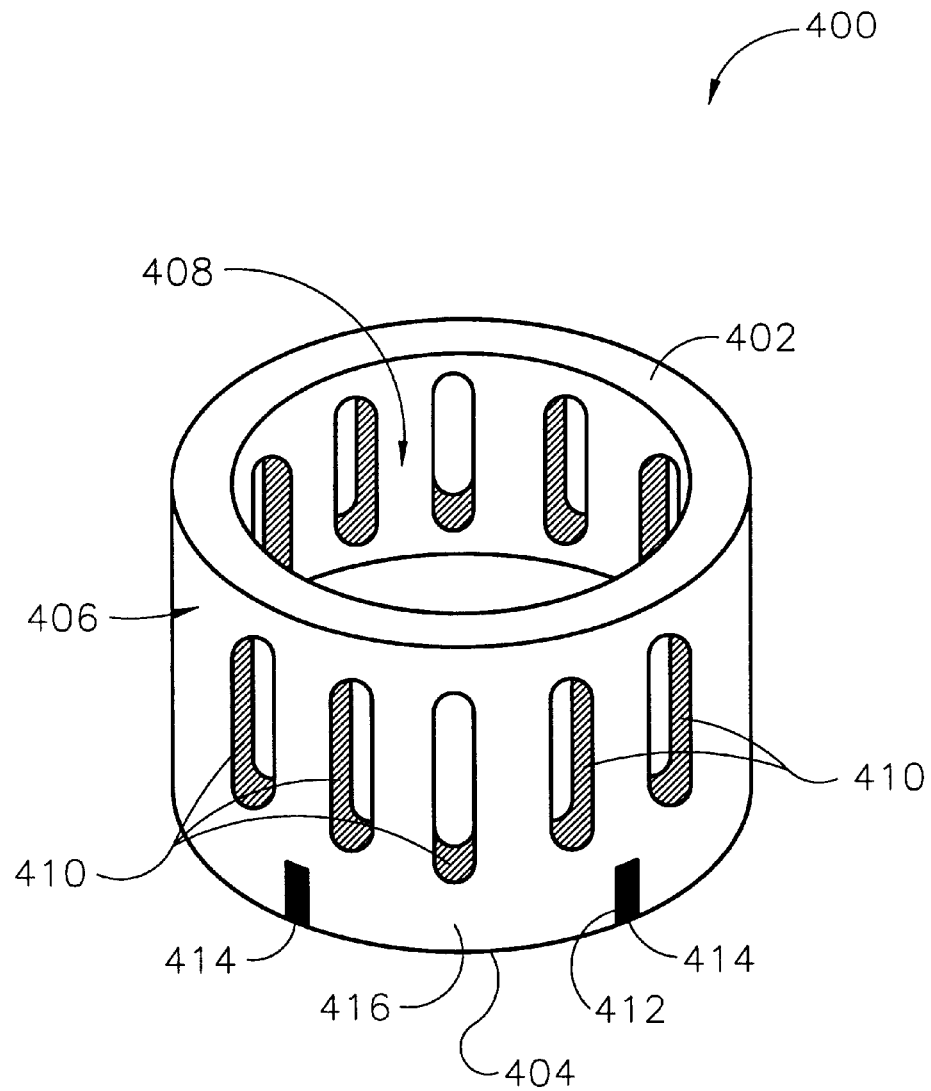
FIG. 5 is a perspective view of a bird-cage rotor including bearing pins according to the invention.
Figure 6:
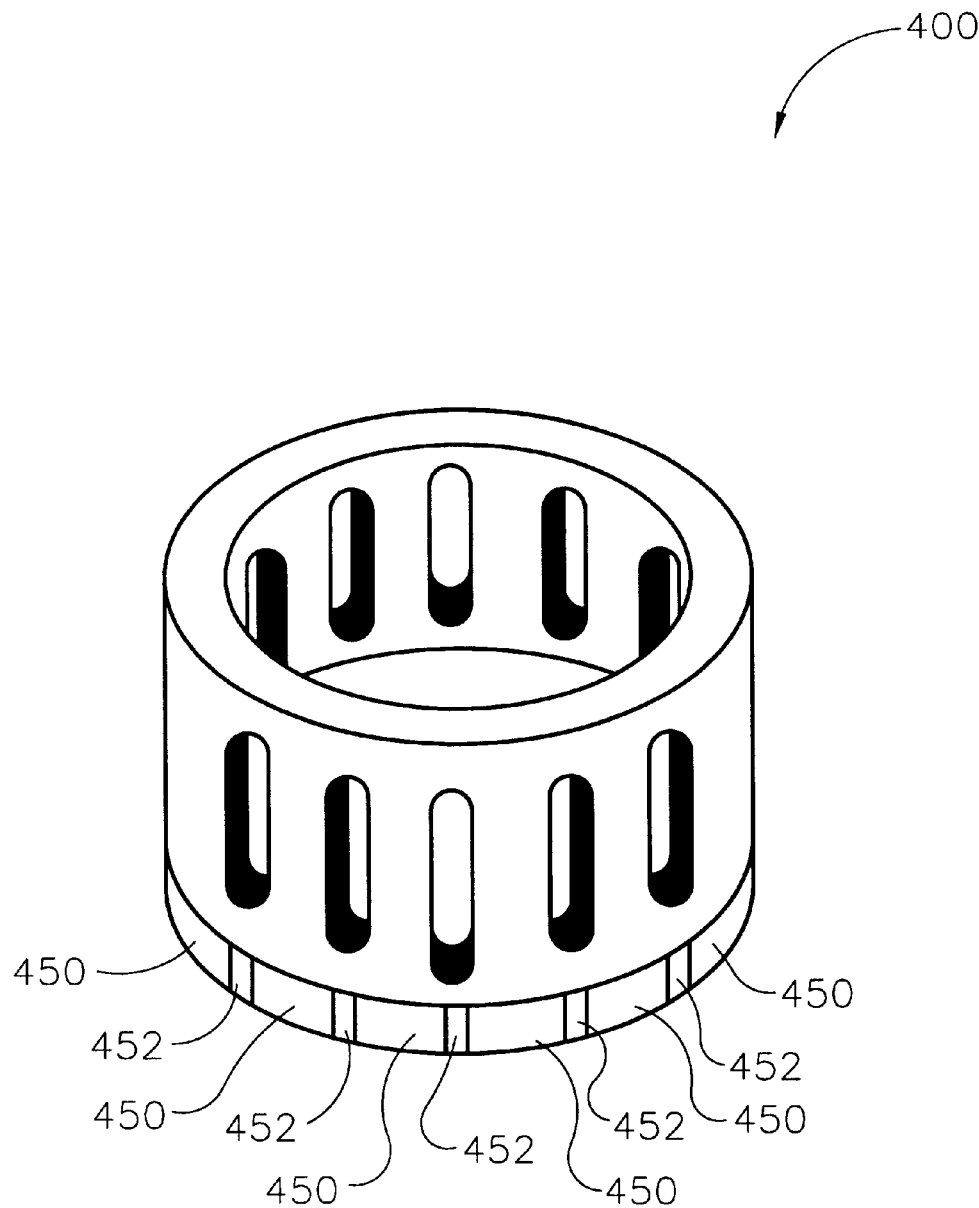
FIG. 6 is a perspective view of a rotor including a split-ring embodiment of the invention.
Figure 7:
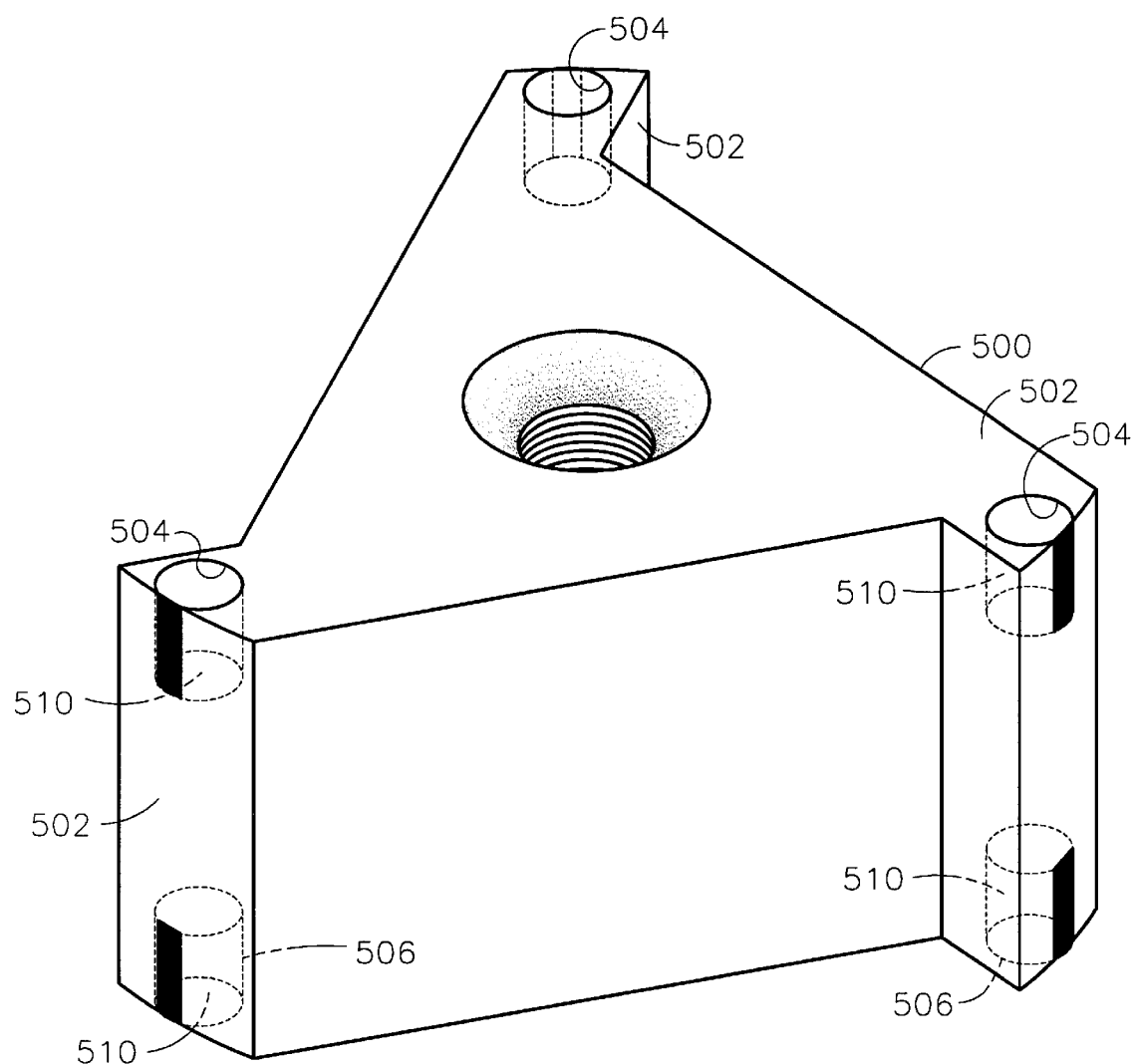
FIG. 7 is a perspective view of a dual-flow rotor in accordance with the invention.

The rotor used in the present invention can be of any configuration, such as a vaned impeller or a bladed impeller (as generally shown in FIGS. 3 and 7), or a bird-cage impeller (as generally shown in FIGS. 5 and 6), these terms being known to those skilled in the art, and the rotor may or may not include a base. The scope of the invention encompasses any rotor used in a molten metal pump whereby a plurality of bearing pins are mounted in or on the rotor to create a second bearing surface that aligns with a first bearing surface to guide the rotor during operation.

The bearing pins are positioned along a bearing perimeter of the rotor. As used herein, the term bearing perimeter refers to any perimeter or portion of a rotor that aligns with the first bearing surface of the pump base 24. The bearing perimeter may be formed on the rotor base, or on the rotor vanes, and it may or may not constitute the rotor's greatest width. The outer surfaces of the bearing pins collectively form a second bearing surface that aligns with the first bearing surface in order to guide the rotor. The second bearing surface, therefore, is discontinuous and comprised of a plurality of spaced-apart pins.

When rotor 100 is assembled into chamber 26 of base 24, there is preferably a gap of 0.030"–0.125" and most preferably 0.040"–0.060" between the first bearing surface 62, of ring 60A and the second bearing surface, which is formed by the collective outer surfaces of pins 200.

Figure 2A:
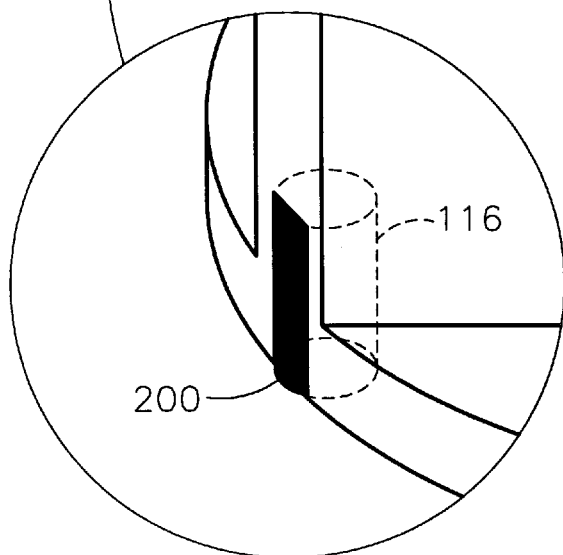
FIG. 2A is an enlarged view of area 2A in FIG. 2 showing in phantom a bearing pin according to the invention.
Figure 2B:
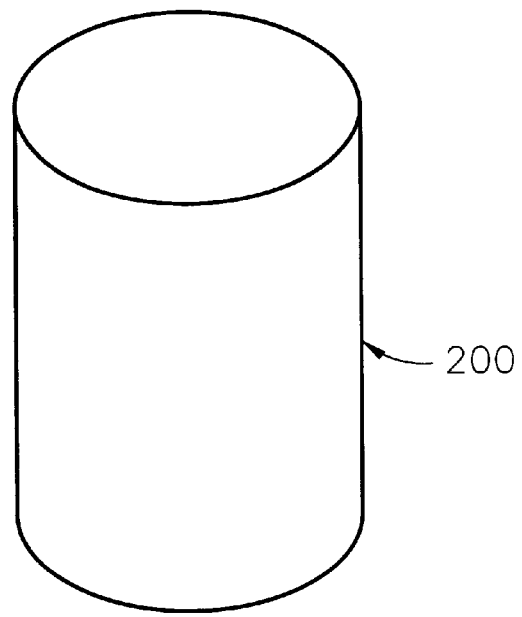
FIG. 2B is a perspective view of the bearing pin shown in FIG. 2.

In the preferred embodiment, pin 200, best seen in FIGS. 2A and 2B, is a solid refractory member having a hardness H greater than the hardness of the material comprising rotor 100. As rotor 100 is preferably comprised of solid graphite, each pin 200 is preferably harder than graphite and is most preferably comprised of silicon carbide. Pin 200 is preferably solid and can be of any shape; it need only be designed so that its configuration and dimensions are such that it is not prone to breaking during shipping or usage. In the embodiment shown in FIGS. 2–2B, pin 200 is preferably a 1⅛" diameter cylinder having a length L substantially equal to the thickness of rotor base 104, although a pin having a diameter of ¼" or greater would suffice and the length L could be less than or greater than the thickness of the rotor base, although it is preferred that L be at least ½".

Each pin 200 is preferably attached to rotor 100 within a recess 116 formed to receive pin 200. The recess aligns the outer surface of each pin 200 so that it is preferably substantially flush with the outer surface 110 of base 104, although pin 200 can extend beyond base 104. Depending upon the configuration of pin 200, the design of pump chamber 26 and rotor 100, and the method of attachment of pin 200 to rotor 100, pins 200 can extend outward from rotor 100 by practically and distance.

As used herein, the term substantially flush refers to a configuration in which the outer surface of pin 200 is flush with, or up to 0.040" inside of, the outer surface 110 of rotor 100. Recess 116 also helps to contain pin 200, reducing thermal expansion, thereby helping to reduce thermal fracture. When inserted into recess 116, pin 200 is preferably cemented in place. When a plurality of pins are mounted in a rotor, such as pins 200 in rotor 100 as shown in FIG. 2, their outer surfaces collectively form a second bearing surface which is aligned with the first bearing surface of the pump housing 24.

Figure 3A:
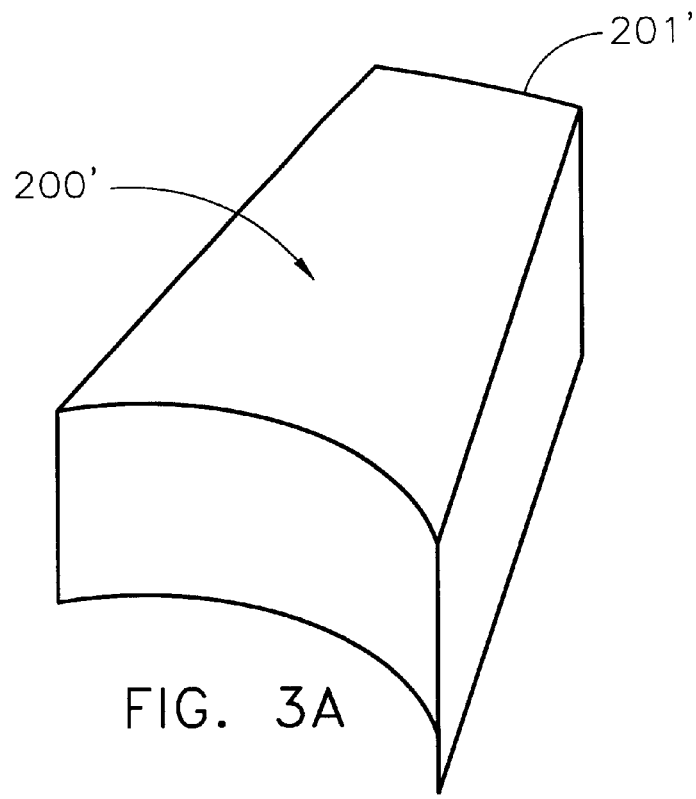
FIG. 3A is a perspective view of the bearing pin shown in FIG. 3.
Figure 3B:
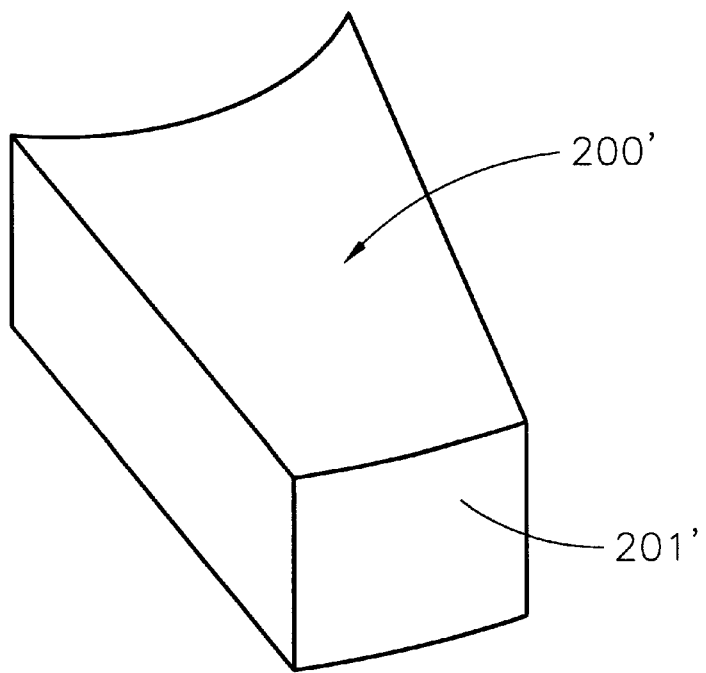
FIG. 3B is side perspective view of the bearing pin shown in FIG. 3.

An alternate embodiment shown in FIGS. 3–3B shows a quadralobal impeller 100 with base 104' having an outer perimeter 110', and pins 200', shown in FIGS. 3A–3B, as being wedge-shaped refractory members formed within recesses 116'. The collective outer surfaces 201' of pins 200' (best seen in FIGS. 3A and 3B) form the second bearing surface.

Figure 2C:
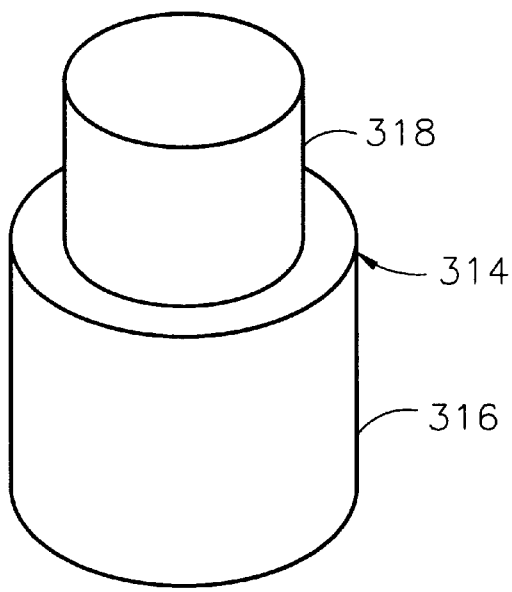
FIG. 2C is a perspective view of an alternative bearing pin profile.
Figure 4:
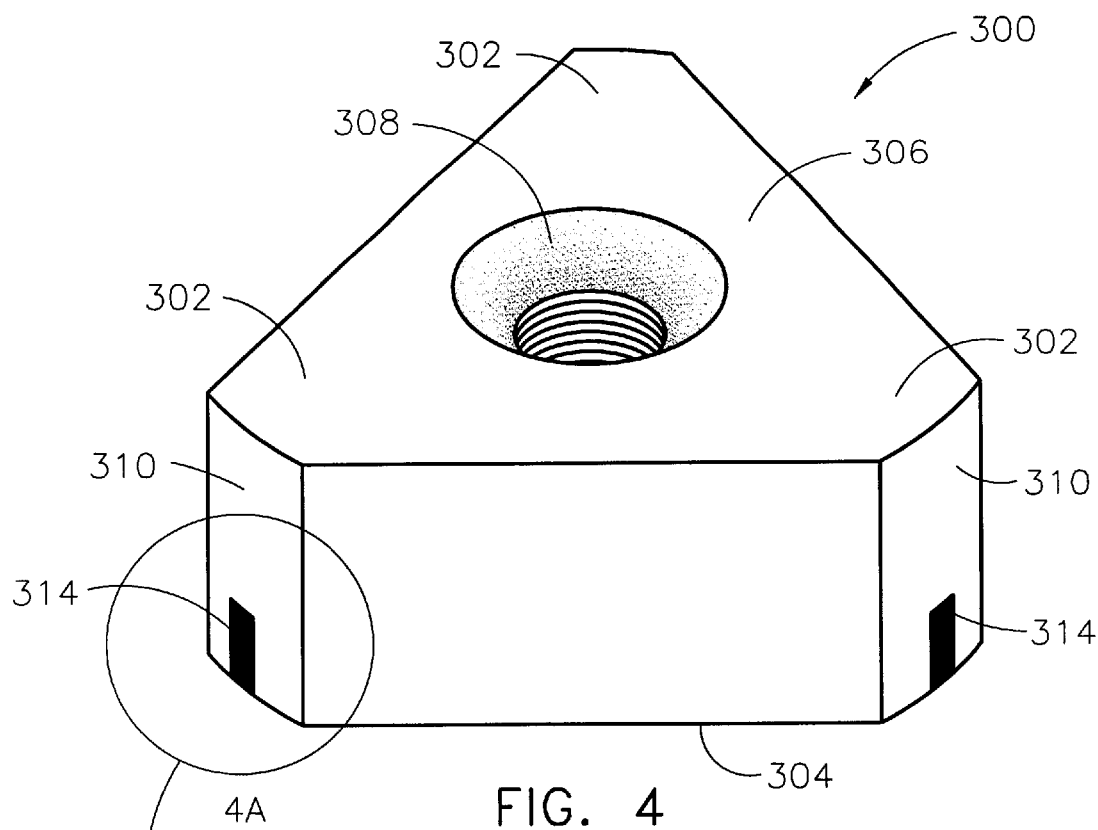
FIG. 4 is a perspective view of an alternate rotor including alternate bearing pins according to the invention.
Figure 4A:
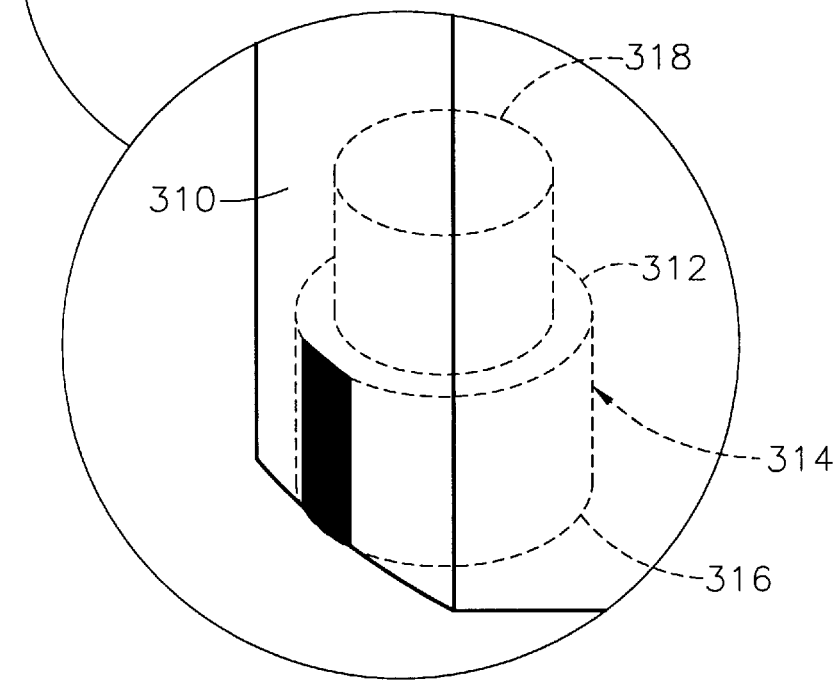
FIG. 4A is an enlarged view of area 4A in FIG. 4 showing in phantom the alternate bearing pins of FIG. 4.

Another embodiment of the invention is shown in FIGS. 4 and 4A, which shows a triangular (or trilobal) rotor 300, that does not include a base. Rotor 300 has three vanes 302, a bottom 304, a top 306, and a connective portion 308. Each vane 302 has an outer tip 310 having a recess 312 formed therein. A bearing pin 314, best shown in FIGS. 2C and 4A, is attached to each vane 302, one being inserted in each recess 312. Each pin 314 is solid and stepped, being formed as two coaxial cylinders 316, 318, with cylinder 316 preferably having a diameter of 1½" and cylinder 318 preferably having a diameter of 1⅛".

A second bearing surface is formed by the collective outer surfaces of pins 314, which is aligned with a first bearing surface. Preferably, pins 314 are substantially flush with or extend slightly outward from the respective outer surfaces of tips 310 of vanes 302.

FIG. 5 shows a bird-cage rotor 400, which is normally used with a casing having a volute pump chamber (not shown), which is known by those skilled in the art. Rotor 400 has a top 402, a bottom 404 and an annular side wall 406 defining a cavity 408. Openings 410 are formed in sidewall 406. Recesses 412 are formed about the lower perimeter of wall 406, and recesses 412 receive and retain bearing pins 414. Each pin 414 is preferably cylindrical, having the same dimensions as previously-described pins 200. The collective outer surfaces of pins 414 form a second bearing surface, which is aligned to mate with a first bearing surface (not shown). Preferably, pins 414 are substantially flush with, or extend slightly outward from, annular wall 406.

Another alternate embodiment is shown in FIG. 6 wherein bird-cage rotor 400 includes split-ring members 450. Each member 450 may be a wedge-like member, such as is shown in FIGS. 3A and 3B. Alternatively, as shown in FIG. 6, members 450 may be curved sections, wherein the outer surface of each member 450 forms an arc of a circle having a diameter substantially equal to the outer diameter of impeller 400. A gap 452 separates each individual bearing component 450.

Another alternative of the present invention is shown in FIG. 7. There is shown a dual flow impeller 500 having three vanes 502. Each vane 502 has a recess 504, on its upper end, and a recess 506, on its lower end. Each recess 504 and 506 receive a cylindrical pin 510 which is similar to pins 200, preciously described. The exterior surfaces of pins 500 form an upper second bearing surface and a lower second bearing surface.

Alternatively, the rotor may be monolithic, meaning that it has no bearing member such as a ring or pin. Such a monolithic rotor is preferably formed of a single material, such as oxidation-resistant graphite, which is well known to those skilled in the art. As used herein, the term material means any generally homogenous composition and can be a homogenous blend of different materials. A bearing surface is formed of the same material as the rotor and is preferably integral with the rotor. Any of the previously described rotor configurations described herein may be monolithic, having a second bearing surface comprised of the same material as the rotor, and fit into the pump chamber and against the first bearing surface in the manner previously described herein.

Figure 12A:
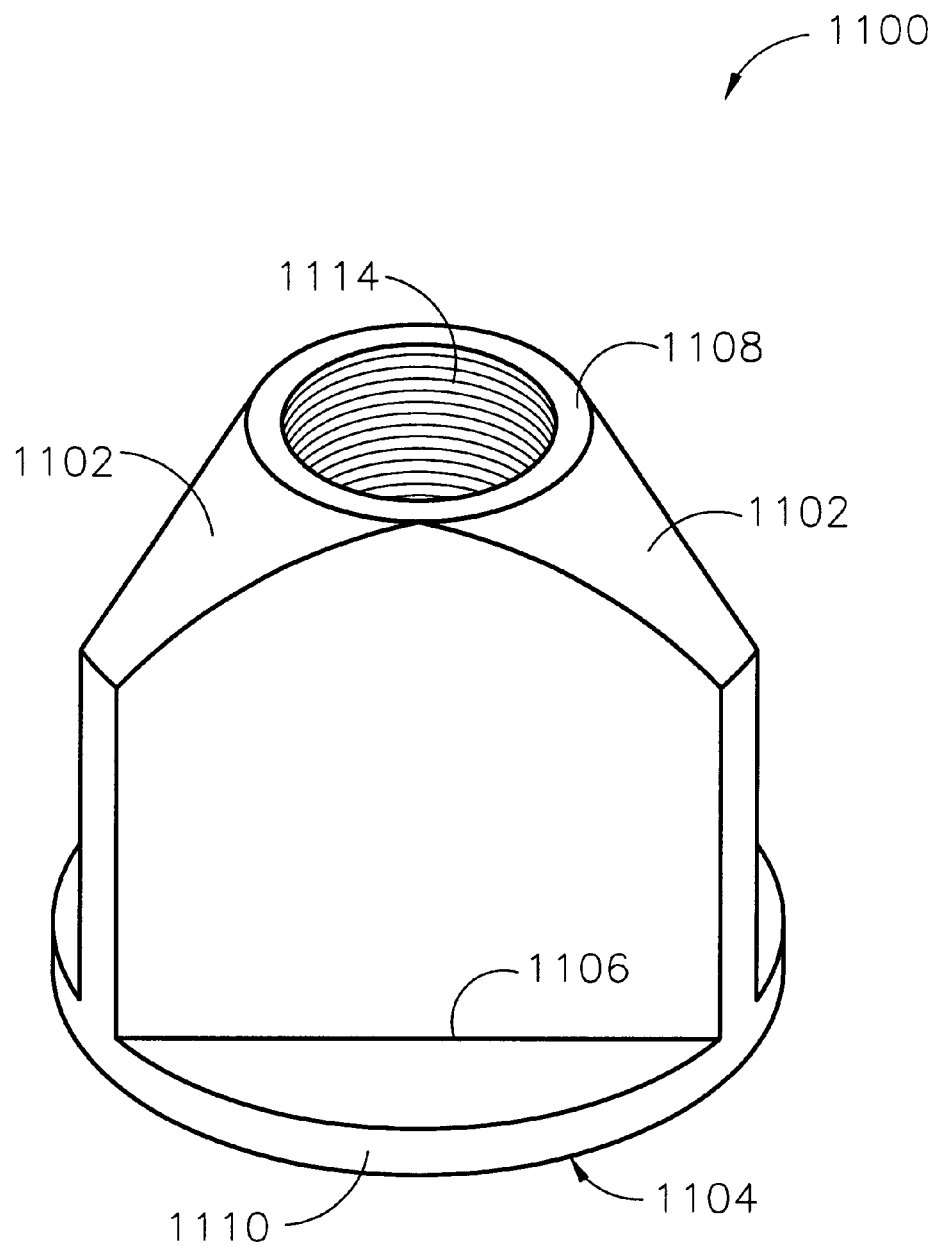
FIGS. 12A–12E are perspective views of monolithic rotors according to the invention.
Figure 12B:
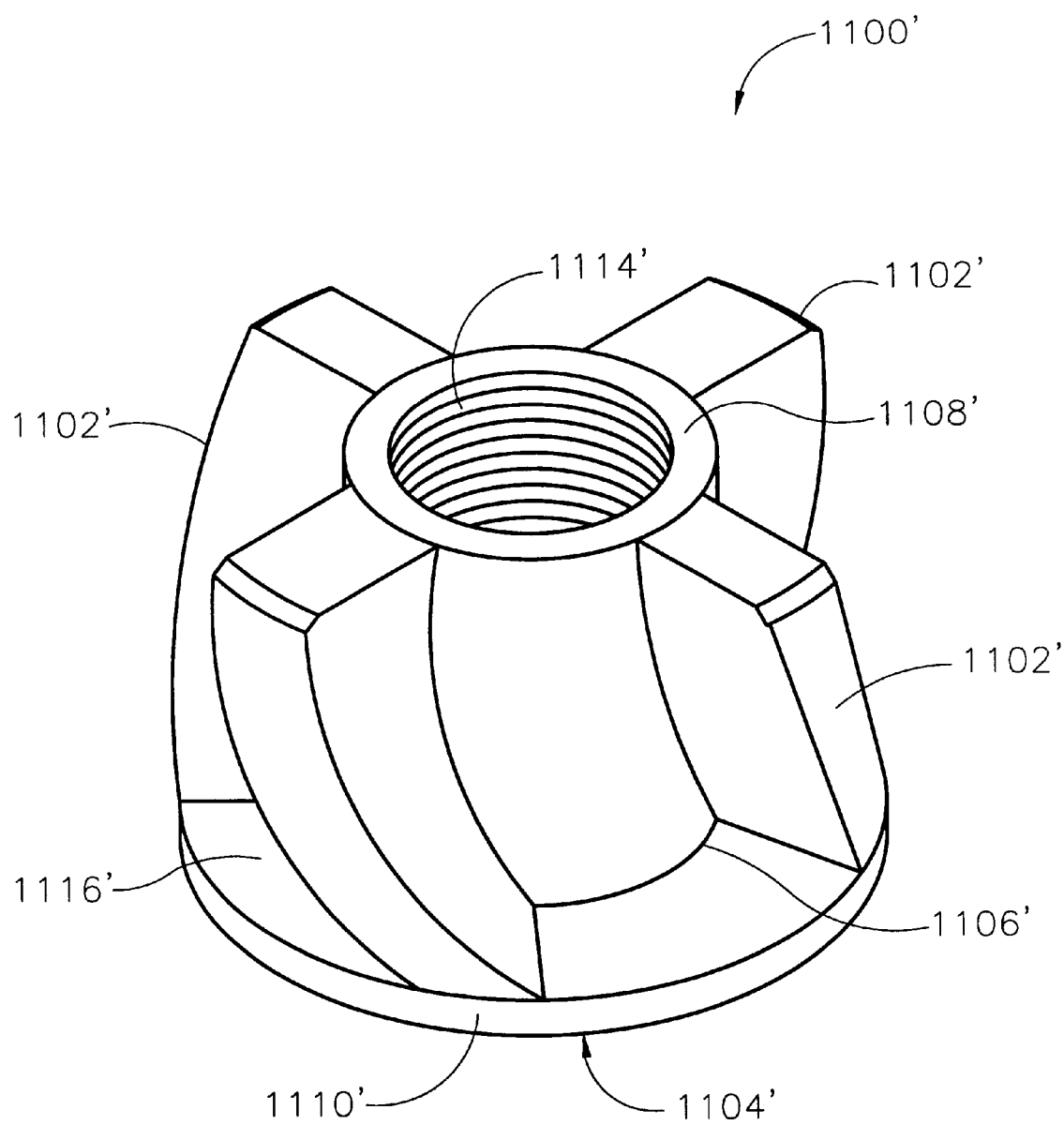
Figure 12C:
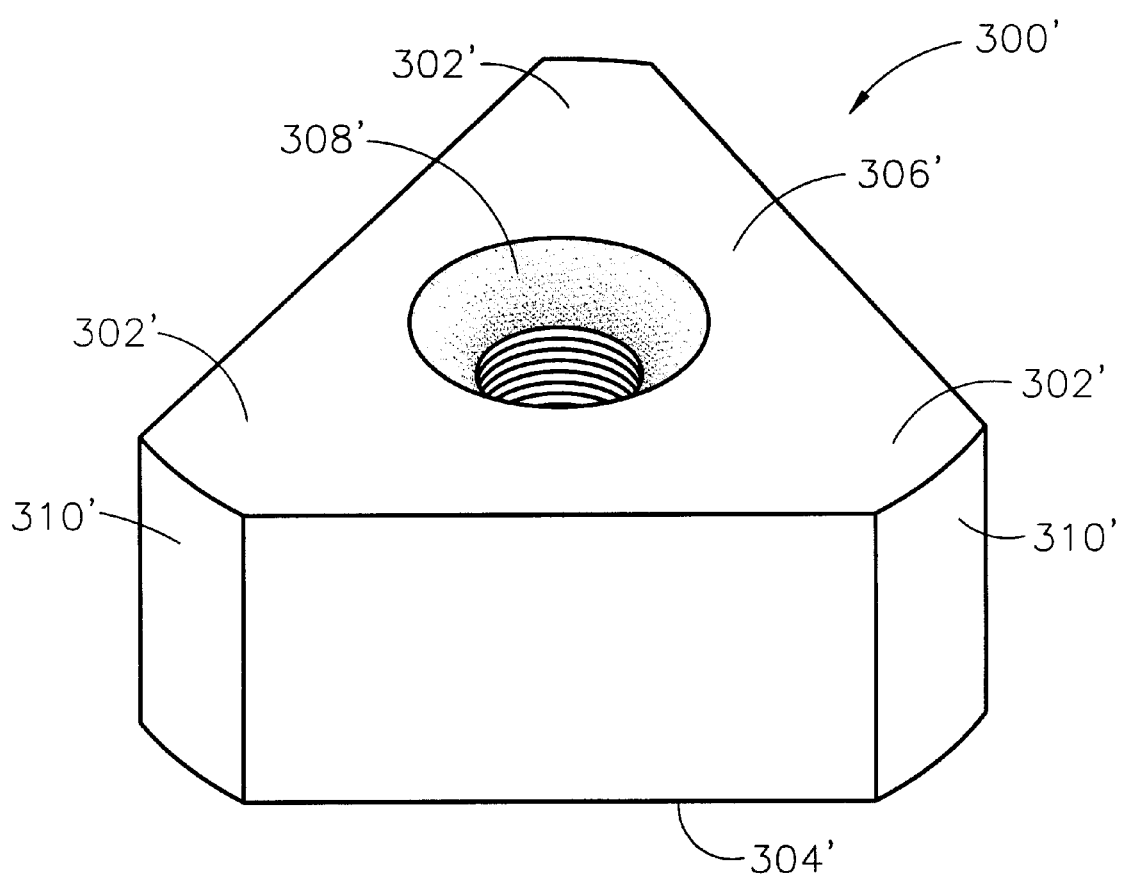
Figure 12D:
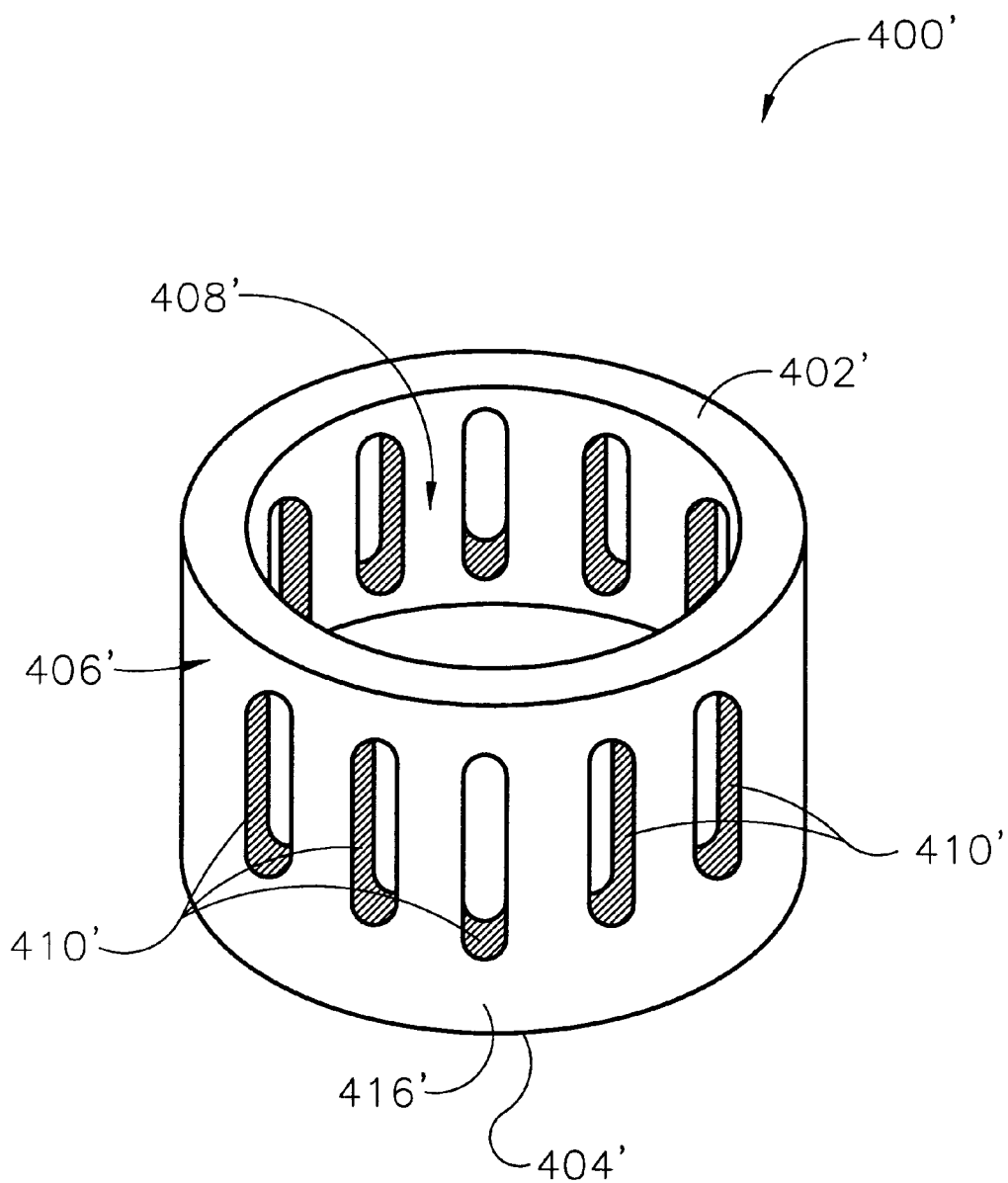
Figure 12E:
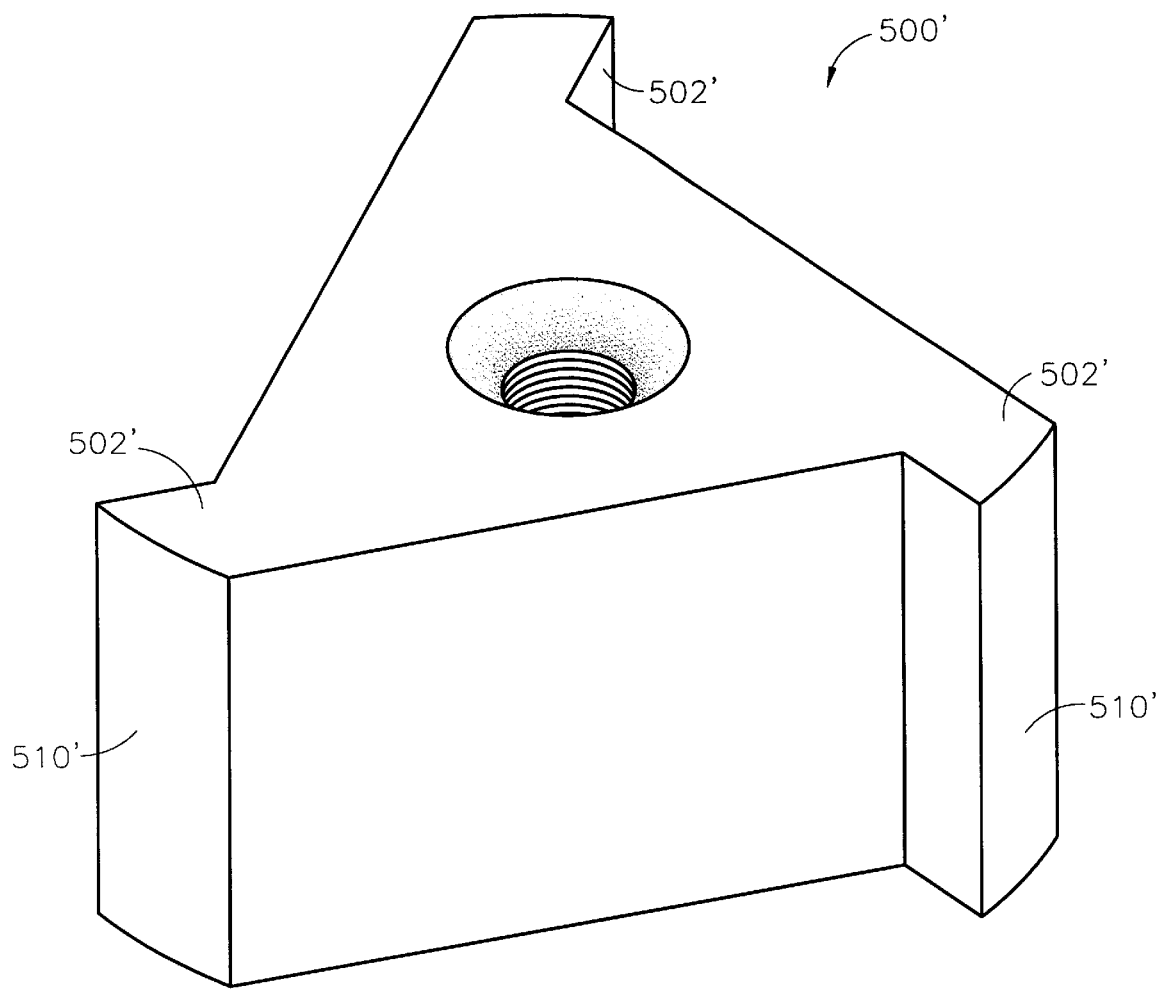
Figure 13:
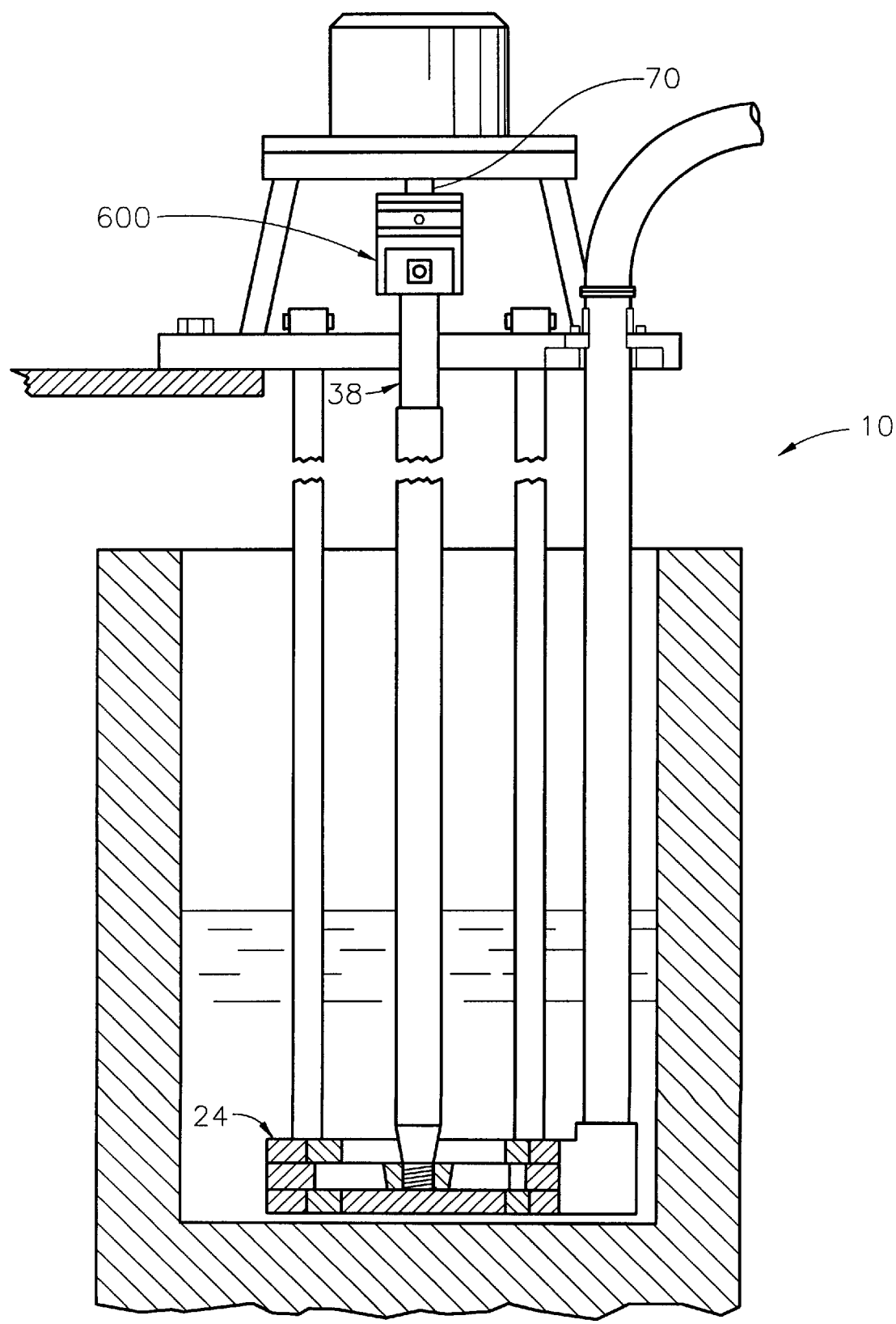
FIG. 13 is a view of a rotor shaft and motor shaft coupled by a rigid coupling member.

Five specific monolithic rotors are disclosed, respectively, in FIGS. 12A–12E. FIG. 12A shows a rotor 1100 that is identical to previously described rotor 100 except that it does not include bearing pins 200. Rotor 1100 has a bearing surface 1110 that is integral with and formed of the same material as rotor 1100. FIG. 12B shows a rotor 1100' that is identical to previously described rotor 100' except that it does not include bearing pins 200'. Rotor 1100' has a bearing surface 1110' integral with and formed of the same material as rotor 1100'. FIG. 12C shows a trilobal rotor 300' that is identical to previously described rotor 300' except that it does not include bearing pins 314. Rotor 300' has bearing surfaces 310' integral with and formed of the same materials as rotor 300'. FIG. 12D shows a bird cage impeller 400' that is identical to previously described rotor 400 except that it does not include bearing pins 414. Rotor 400' has a bearing surface 416' integral with and formed of the same material as rotor 400'. FIG. 12E shows a rotor 500' that is identical to previously described rotor 500 except that it does not include bearing pins 510. Rotor 500' has bearing surfaces 510' that are integral with, and formed of the same material as rotor 500'.

When a monolithic rotor consists of a relatively soft material, such as graphite, it is preferred that the rotor be rigidly centered in the pump chamber to reduce movement and thus prevent wear on the relatively soft bearing surface. The monolithic rotors disclosed herein are rigidly centered by the use of a coupling 600 that firmly holds the rotor shaft and rotor in place. Most known couplings, in order to reduce the likelihood of damage to the rotor shaft, and to prevent damage to the rotor-shaft-to-motor-shaft coupling, are flexible to allow for movement. Such movement may be caused by jarring of the rotor by pieces of dross or brick present in the molten metal, or simply by forces generated by the movement of the rotor within the molten metal. Such a coupling is disclosed in pending U.S. patent application Ser. No. 08/759,780 to Cooper entitled "Molten Metal Pumping Device," the disclosure of which is incorporated herein by reference. Another flexible coupling is described in U.S. Pat. No. 5,203,681 to Cooper at column 13,1. 47-column 14,1. 16.

Figure 14:
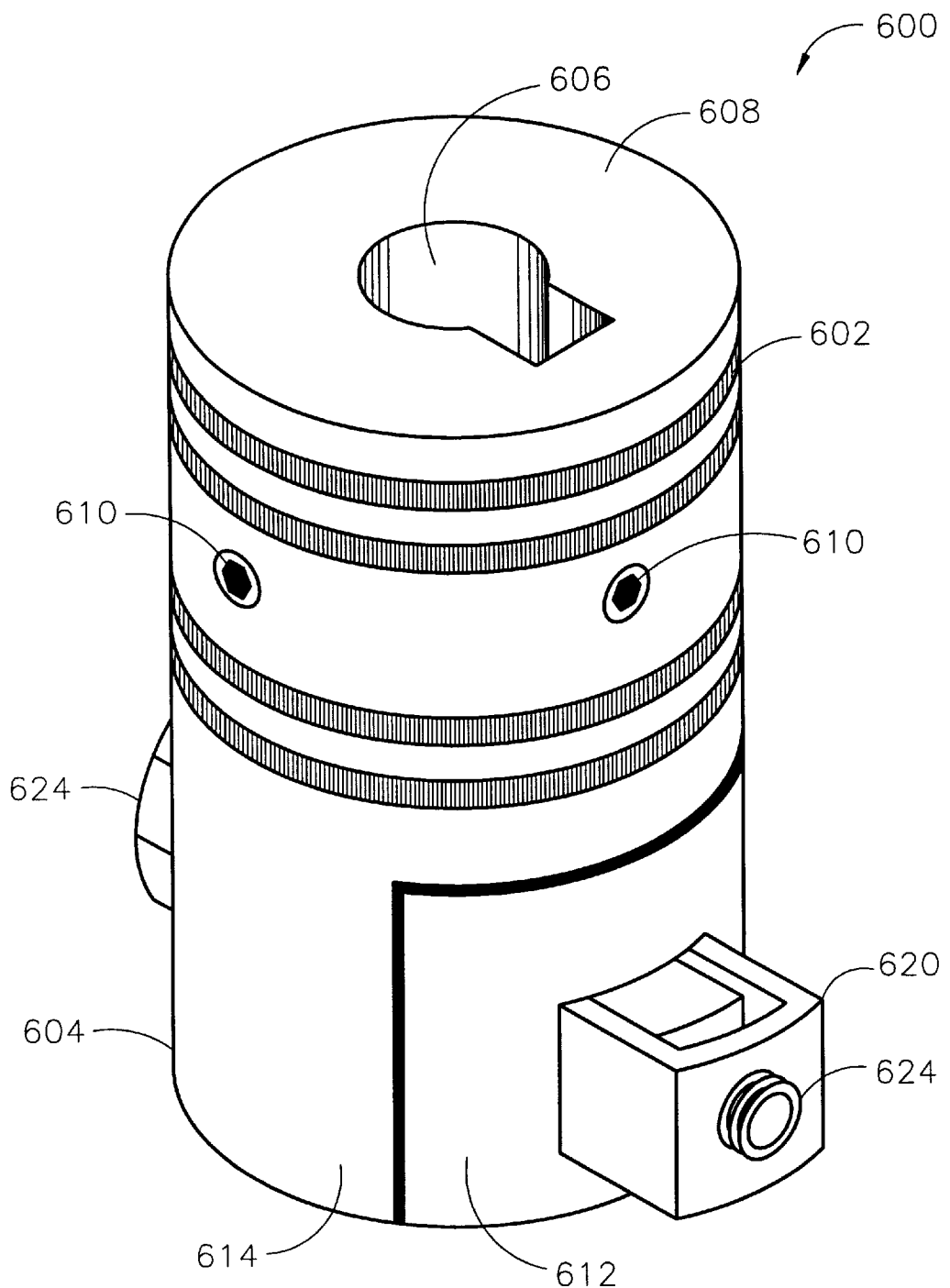
FIG. 14 is a perspective view of the rigid coupling member shown in FIG. 13.
Figure 15:
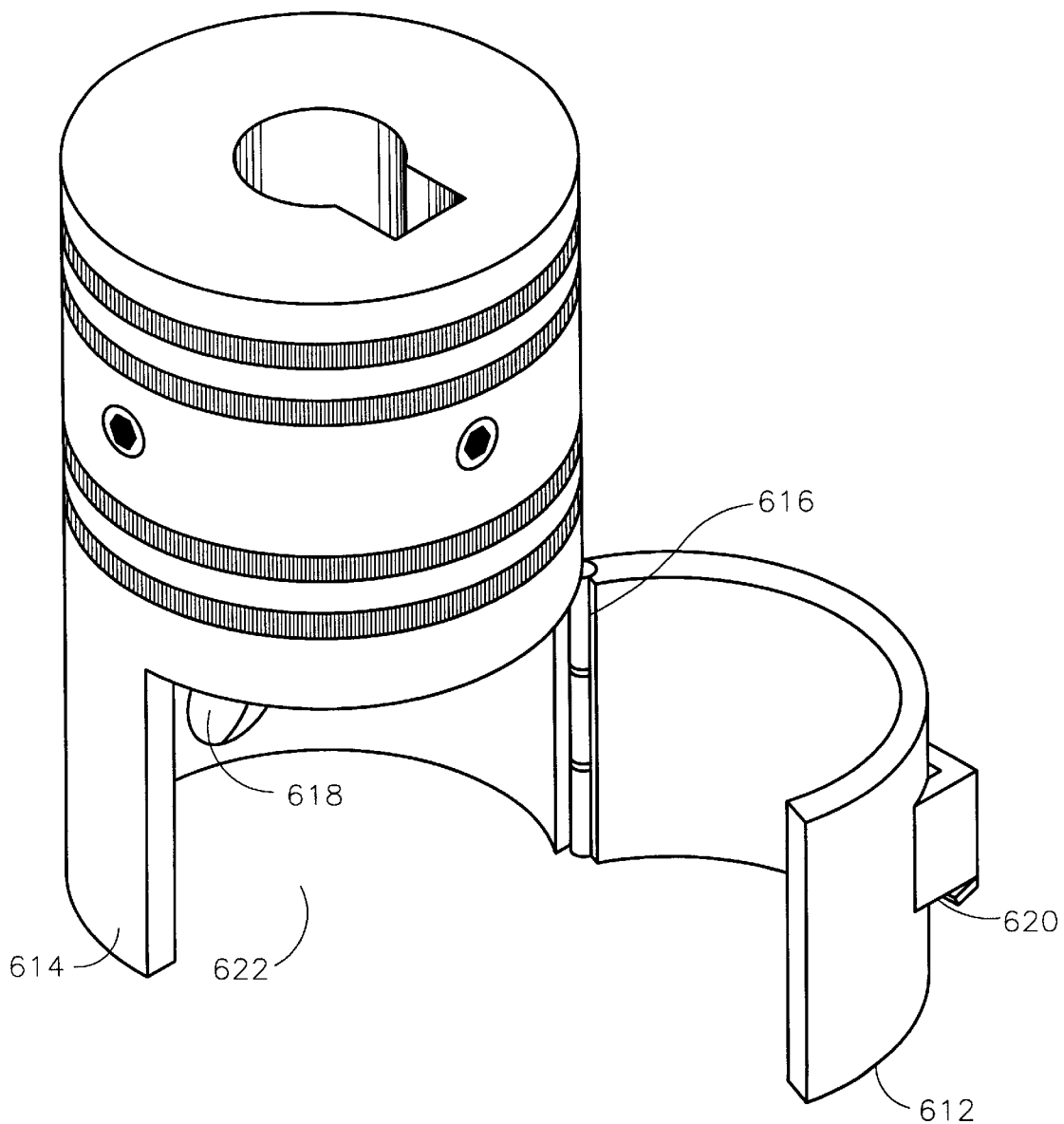
FIG. 15 is a perspective view of the coupling member shown in FIGS. 13 and 14 with its hinged door in an open position.

A preferred embodiment of a rigid coupling is shown in FIGS. 14–15. Rigid coupling 600 vertically and rigidly couples motor shaft 70 to rotor shaft 38. Rigid coupling 600 is a one piece coupling incorporating two coupling members, first member 602 and second member 604. Member 602 is designed to receive motor shaft 70 (which is preferably keyed), within keyed opening 606 formed in upper surface 608. Set screws 610, of which there are preferably four spaced equally about the circumference of coupling 600, are tightened against shaft 70 to help retain it within opening 606. Member 604 has a hinged door 612 and fixed portion 614. Hinge 616 is attached to door 612 and to portion 614 and allows door 612 to move between a closed position (shown in FIG. 14) and an open position (shown in FIG. 15). An aperture 618 is formed in portion 614 and a corresponding, axially-aligned aperture (not shown) is formed in door 612. A bolt-retention device, or boss 620 is connected to door 612 and has an aperture 621 axially aligned with the aperture in door 612 and aperture 618. Member 604 defines a cylindrical opening 622 when door 612 is in the closed position. Rotor shaft 38 is machined to have a particular outer diameter (usually 2.00"). Cylindrical opening 622 is formed to have an inner diameter approximately equal to the outer diameter of shaft 38. Given that the outer diameter of shaft 38 and the inner diameter of opening 622 are equal (or nearly equal, even after accounting for machining tolerances) shaft 38 could not be received in opening 622 unless member 604 is formed in two sections that are tightened around shaft 38. The purpose in making the inner diameter of shaft 38 equal to the outer diameter of opening 622 is that, once connected, there is virtually no movement of shaft 38 (i.e., coupling 600 is a rigid coupling). This greatly restricts the movement of the rotor and enables a monolithic rotor as defined herein to be used. As used herein, the term equal, when referring to the relationship between the diameter of opening 622 and the outer diameter of shaft 38 means that the outer diameter of shaft 38 is within the range of +/−0.020" the diameter of opening 622.

The advantage of hinge 616 and hinged door 612 is that assembly and disassembly are simple and fast. Door 612 need not be used with a hinge, as long as it can move between an open position and a closed position.

When rotor shaft 38 is received in opening 622, door 612 is closed and a bolt 624 is passed through aperture 618, through an aligned passage, or locating bore, (not shown) in rotor shaft 38, through the axially-aligned aperture in door 612 and is threaded into boss 620.

Other rigid couplings may also be used to practice the invention. For example, if rotor shaft 38 includes an internal passage for transferring gas, lower coupling half 604 could be replaced by a coupling such as coupling 100 disclosed in U.S. Pat. No. 5,678,807 to Cooper entitled "Rotary Degasser," the disclosure of which is incorporated herein by reference.

Figure 8:
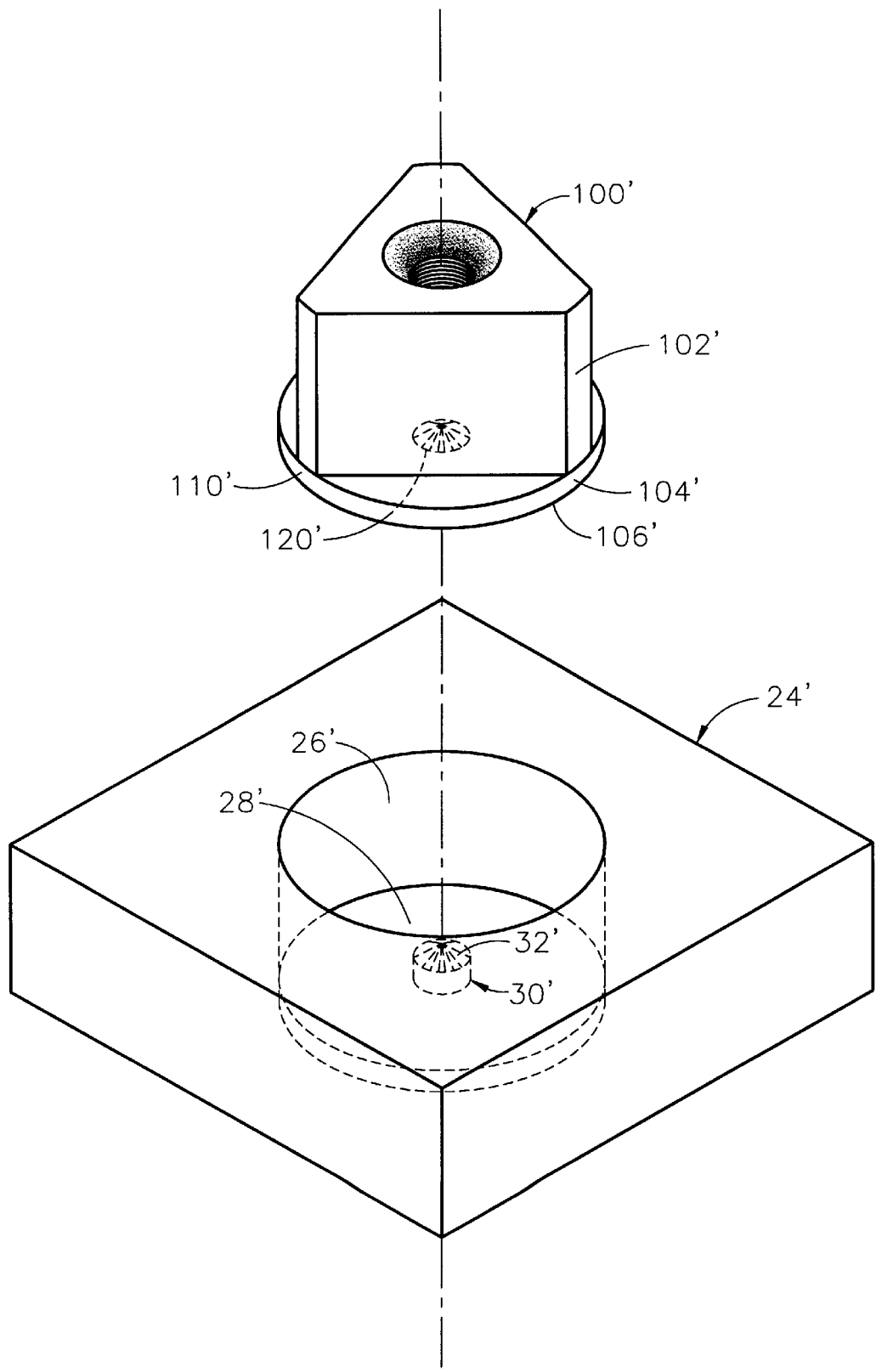
FIG. 8 is a perspective view of an alternate pump housing and rotor in accordance with the invention, which includes a plug in the pump chamber base.
Figure 9:
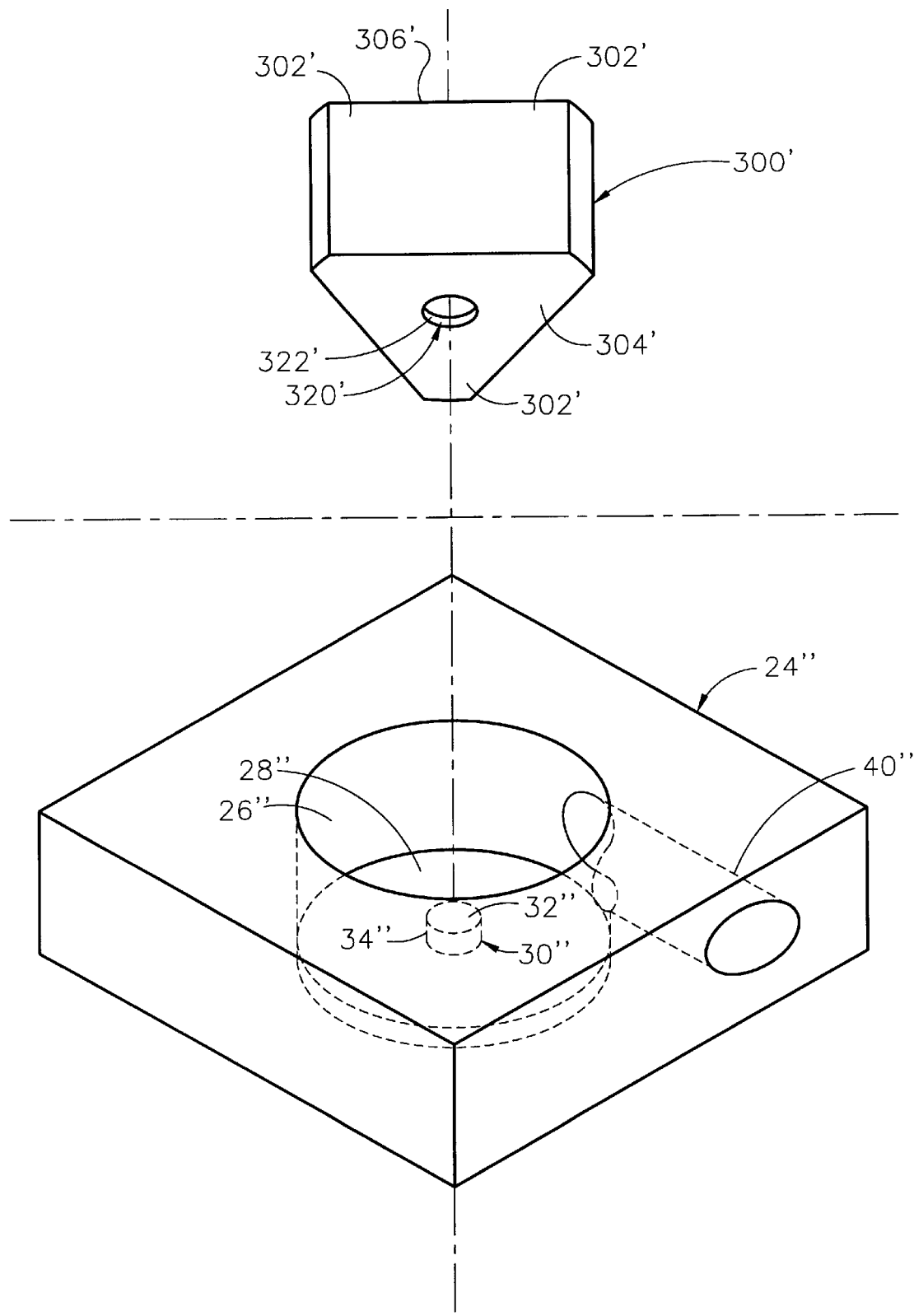
FIG. 9 is a perspective view of an alternate embodiment of the present invention, which includes a bearing plug in the pump chamber base and a bore in the rotor bottom.
Figure 10:
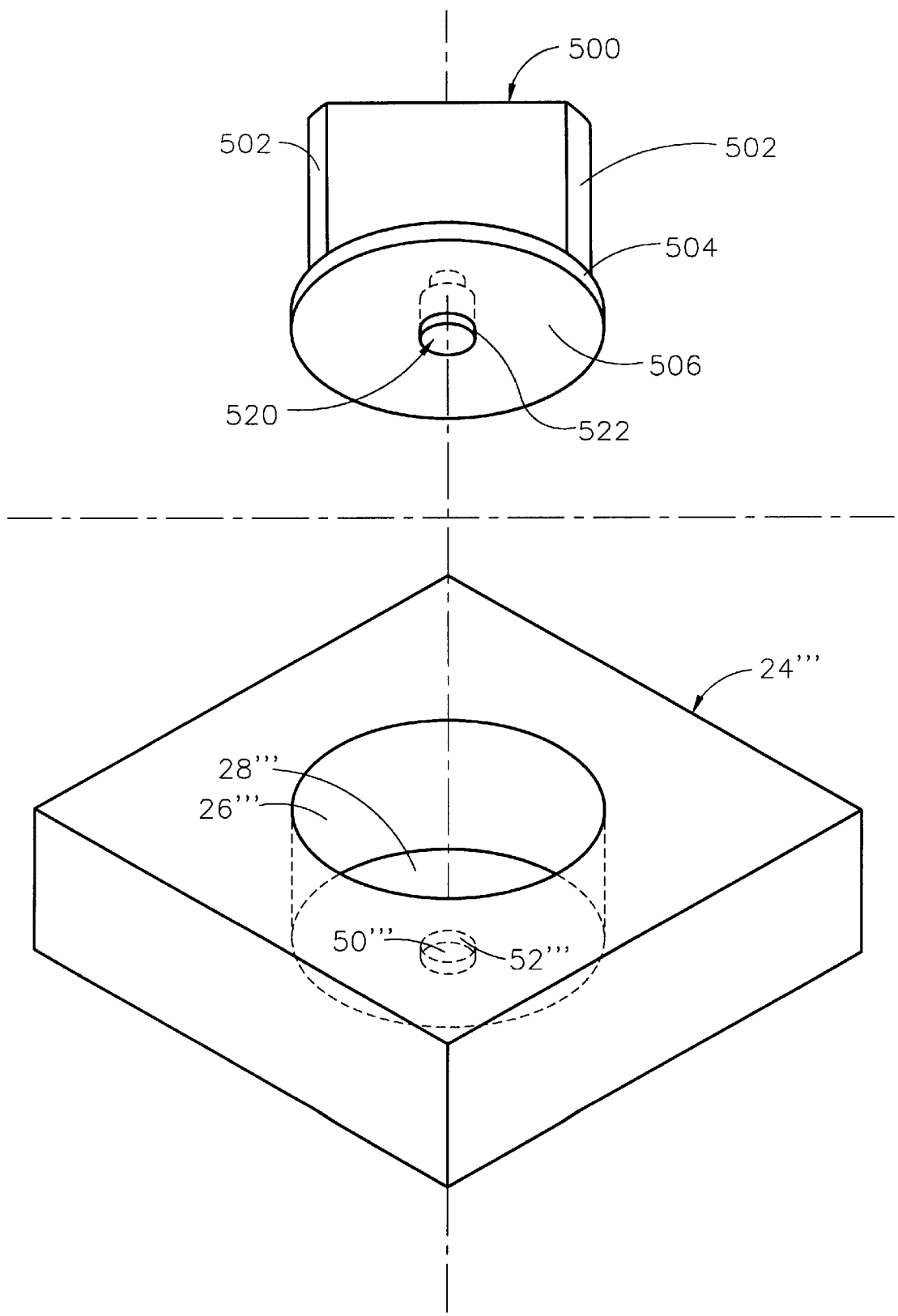
FIG. 10 is a perspective view of an alternate embodiment of the invention including a bearing plug extending from the rotor bottom.

FIGS. 8–10 show configurations in which a bearing plug and corresponding recess, rather than a plurality of bearing pins, are used to guide the rotor and vertically align the rotor in the pump chamber.

FIG. 8 shows an alternate pump housing 24' and rotor 100' in accordance with the invention. Pump housing 24' has a pump chamber 26' having a base 28'. A bearing plug 30' extends from base 28' and preferably has a generally conical top surface 32'. Rotor 100' includes vanes 102', base 104' housing and bottom 106'. A recess, or bore, 120' is formed in the bottom 106' and is dimensioned to received end 32' of plug 30'. End 32' therefore, is the first bearing surface and the surface of recess 120' that aligns with end 32' is the second bearing surface.

FIG. 9 shows a pump base 24" including a pump casing 26" having a base 28". A bearing plug 30" extends from base 28" and preferably has a generally flat top surface 32" and a cylindrical outer surface 34". Rotor 300' has three vanes 302', a bottom 304' and a top 306'. A cylindrical bore, or recess, 320' is formed in bottom 304', and has annular side wall 322'. Bore 320' is dimensioned to receive plug 30". In this embodiment, wall 34" forms the first bearing surface and wall 322' forms the second bearing surface.

FIG. 10 shows a pump base 24'" having a chamber 26'" including a base 28'". A recess, or bore, 50'" is formed in base 28'" and has annular side wall 52'". Rotor 500 has vanes 502, and base 504 having a bottom 506. A bearing plug 520 extends from bottom 506 and has an annular outer surface 522. Plug 520 is dimensioned to be received in recess 50'". In this embodiment, wall 52'" forms the first bearing surface and wall 522 forms the second bearing surface.

Turning again now to FIGS. 1, 1A and 2 to describe the operation of a system according to the invention, motor 40 turns shaft 38 and rotor 100. Rotor 100 is positioned within chamber 26 so that bearing pins 200, which form the second bearing surface, are aligned with bearing surface 62, preferably formed at bottom of chamber 26. Rotor 100 and pins 200 are dimensioned so that a small gap (preferably 0.040"–0.060") exists between bearing surface 62 and the second bearing surface. Motor 40 turns shaft 38 and rotor 100.

If a monolithic rotor is used the operation is the same except that there are no separate bearing members. For example, if rotor 1100 shown in FIG. 12A is used, rotor 1100 is positioned within chamber 26 so that bearing surface 1110 aligns with bearing surface 62. A small gap (preferably 0.040"–0.060") exists between bearing surface 62 and bearing surface 1100. Alternatively, pump casing 24', shown in FIG. 11, can be used with a monolithic rotor, such as rotor 1100. In that case, bearing surface 1110 will be aligned with bearing surface 62A'. (As those skilled in the art will understand, if rotor 1100 is used, casing 24' would only include bearing surface 62A' and not include bearing surface 61'.) Further, when a monolithic rotor is used, it is preferred that the rotor be rigidly centered in the pump casing and, hence, in the first bearing surface, such as surface 62A'. The preferred method for rigidly centering the rotor is by the use of a rigid motor-shaft-to-rotor-shaft coupling 600, as previously described.

Having thus described preferred embodiments of the invention other variations and embodiments that do not depart from the spirit of the invention will become readily apparent to those skilled in the art. The scope of the present invention is thus not limited to any one particular embodiment, but is instead set forth in the appended claims and the legal equivalents thereof.

What is claimed is:

1. A device for pumping or otherwise converting molten metal, said device comprising:
   a) a motor;
   b) a motor shaft extending from said motor, said motor shaft having a first end and a second end;
   c) a rigid coupling having a first coupling member and a second coupling member, said second coupling member having a fixed portion and a door connected to said fixed portion, said door having an open position and a closed position, said first coupling member connected to said second end of said motor shaft;
   d) a rotor shaft having a first end and a second end, said first end connected to said second coupling member;
   e) a pump casing having an inlet, a pump chamber in fluid communication with said inlet and a discharge in fluid communication with said pump chamber;
   g) a rotor attached to said second end of said rotor shaft and positioned within said pump chamber.

2. A device as defined in claim 1 wherein, said door is connected to said fixed portion by a hinge.

3. A device as defined in claim 1 wherein said pump casing is monolithic and said first bearing surface does not include any separate bearing member.

4. A device as defined in claim 1 wherein said rotor is comprised entirely of a single material.

5. A device as defined in claim 4 wherein said rotor is comprised of graphite.

6. The device of claim 1 wherein the rotor is monolithic and does not include a separate bearing member.

7. The device of claim 6 wherein the pump casing is monolithic and does not include a separate bearing member.

8. The device of claim 6 wherein the rotor is comprised of a single material.

9. The device of claim 8 wherein the rotor is comprised of graphite.

10. The device of claim 6 wherein the rotor is trilobal.

11. The device of claim 6 wherein the rotor is a dual-flow rotor.

12. A rigid coupling member for use in a molten metal pump said coupling member including a first coupling member for connecting to a motor shaft and a second coupling member for connecting to a rotor shaft, said second coupling member including a fixed portion and a door connected to said fixed portion, said door having an open position and a closed position.

13. The rigid coupling member of claim 12 wherein said door is connected to said fixed portion of said second coupling member by a hinge.

14. The rigid coupling member of claim 12 wherein said second coupling member defines an opening for retaining said rotor shaft when said door is in said closed position.

15. The rigid coupling member of claim 12 wherein said opening is cylindrical.

16. The rigid coupling member of claim 12 wherein said opening has a diameter and said rotor shaft has an outer diameter, said diameter equal to said outer diameter.

17. The coupling of claim 14 wherein said rotor shaft has an outer diameter that is received in the opening of the second coupling number, and the opening has a diameter, said outer diameter having a dimension equal to +/−.0020" the diameter of said opening.

18. The coupling of claim 12 which further includes two axially-aligned holes for receiving a bolt.

19. The coupling of claim 18 which further includes a boss for retaining said bolt.

* * * * *